United States Patent
Jacobson

(10) Patent No.: US 7,386,791 B2
(45) Date of Patent: Jun. 10, 2008

(54) METHOD AND SYSTEMS FOR CREATING A DIGITAL DOCUMENT ALTERED IN RESPONSE TO AT LEAST ONE EVENT

(75) Inventor: Mark David Jacobson, Denver, CO (US)

(73) Assignee: Format Dynamics, LLC, Denver, CO (US)

( * ) Notice: Subject to any disclaimer, the term of this patent is extended or adjusted under 35 U.S.C. 154(b) by 341 days.

(21) Appl. No.: 10/948,798

(22) Filed: Sep. 24, 2004

(65) Prior Publication Data

US 2005/0097438 A1    May 5, 2005

Related U.S. Application Data

(60) Provisional application No. 60/505,956, filed on Sep. 24, 2003, provisional application No. 60/505,960, filed on Sep. 24, 2003.

(51) Int. Cl.
G06F 15/00 (2006.01)

(52) U.S. Cl. .................... 715/274; 715/243; 715/252; 715/253; 715/788; 705/62; 358/1.12; 358/449

(58) Field of Classification Search ............... 715/517, 715/523, 512, 274, 243, 252, 253, 788; 705/62; 358/1.12, 449
See application file for complete search history.

(56) References Cited

U.S. PATENT DOCUMENTS

| | | | |
|---|---|---|---|
| 4,710,886 A | 12/1987 | Heath | |
| 5,548,508 A | 8/1996 | Nagami | |
| 5,765,176 A | 6/1998 | Bloomberg | |
| 5,796,952 A | 8/1998 | Davis | |
| 5,991,514 A | 11/1999 | Nielsen | |
| 6,006,242 A | 12/1999 | Poole | |
| 6,026,417 A | * | 2/2000 | Ross et al. .................. 715/517 |
| 6,061,700 A | | 5/2000 | Brobst |
| 6,075,535 A | | 6/2000 | Fitzhugh |
| 6,138,155 A | | 10/2000 | Davis |
| 6,157,924 A | | 12/2000 | Austin |
| 6,195,588 B1 | | 2/2001 | Olson-Williams |
| 6,209,030 B1 | | 3/2001 | Ohashi |
| 6,362,894 B1 | | 3/2001 | Shima |
| 6,388,765 B1 | | 4/2002 | Nagano |
| 6,507,410 B1 | | 1/2003 | Robertson |
| 6,839,149 B2 | | 1/2005 | Herr |

(Continued)

OTHER PUBLICATIONS

Eric Meyer, CSS Design: Going to Print, May 10, 2002, A List Apart Magazines.*

*Primary Examiner*—Stephen Hong
*Assistant Examiner*—Matthew J Ludwig
(74) *Attorney, Agent, or Firm*—Barnes & Thornburg LLP

(57) ABSTRACT

A method and system are provided for creating a digital document, the digital document including content layout, additional information, and altering machine executable instructions, the method including, in response to, or subsequent to, a request or activation event, implementing the altering machine executable instructions which may apply auxiliary layout information and may apply auxiliary content information prior to altering and rendering the digital document for the event requested or activated, wherein the altering machine executable instructions may include different instructions for altering and rendering the digital document based on which request event or activation event is initiated or the medium on which the newly rendered digital document will be displayed.

37 Claims, 33 Drawing Sheets

U.S. PATENT DOCUMENTS

| | | |
|---|---|---|
| 6,891,635 B2 | 5/2005 | Dutta |
| 2001/0034775 A1 | 10/2001 | Minowa |
| 2002/0069260 A1 | 6/2002 | Tagg |
| 2002/0143630 A1 | 10/2002 | Steinman |
| 2002/0145627 A1 | 10/2002 | Witmarsh |
| 2002/0165849 A1 | 11/2002 | Singh |
| 2003/0065770 A1 | 4/2003 | Davis |
| 2003/0072025 A1 | 4/2003 | Simpson |
| 2003/0167447 A1* | 9/2003 | Hatta et al. ................. 715/517 |
| 2004/0054589 A1 | 3/2004 | Nicholas |
| 2004/0064443 A1 | 4/2004 | Taniguchi |
| 2004/0066531 A1 | 4/2004 | Kim |
| 2004/0078425 A1 | 4/2004 | Sundfort |
| 2004/0105113 A1 | 6/2004 | Ishida |
| 2004/0236640 A1 | 11/2004 | Kassan |
| 2004/0239681 A1* | 12/2004 | Robotham et al. .......... 345/581 |
| 2005/0024682 A1 | 2/2005 | Hull |
| 2005/0033803 A1 | 2/2005 | Vleet |
| 2005/0044139 A1 | 2/2005 | Christian |
| 2005/0251742 A1* | 11/2005 | Mogilevsky et al. ........ 715/521 |
| 2008/0022197 A1* | 1/2008 | Bargeron et al. ............ 715/246 |

* cited by examiner

ADI PrintTracker Statistics For Generic News
(as of 6:00 PM, July 15, 2004; reports use MST)

| Overview | potential advertising revenue | page analysis | day analysis | time analysis | advertising summary | raw data |
|---|---|---|---|---|---|---|

| Total Actual Printed Web Pages | Today 908,312 | This Week 7,024,850 | This Month 24,766,069 |
|---|---|---|---|
| | Yesterday 1,058,571 | Last Week 10,330,836 | Last Month 30,318,680 |

| Total Printed Pages (annual estimate assuming 3 pages per print job and based on 94 days of collected data) 688,429,200 | Potential Additional Annual Advertising Revenue (assuming 3 ads per print job) |
|---|---|
| | CPM  $15.00  Revenue  $10,326,438 |

| Timeframe Preference For The Reports Below | Past | 7 days ▼ |
|---|---|---|

| Types Of Print Jobs | Printer Friendly | % | Non-Printer Friendly | % |
|---|---|---|---|---|
| | 1,371,283 | 18.5% | 6,041,986 | 81.5% |

Top 5 Most Printed Web Pages

| URL (click on URL to open Web page) | # of print jobs |
|---|---|
| http://news.genericnews.com//news/story.asp?section=Business&storyId=876530 | 116,879 |
| http://news.genericnews.com//news/story.asp?section=Business&storyId=913301 | 112,146 |
| http://yellowpages.genericnews.com/yp.basic.jsp?STYPE=S&SRC=lycosMovie+Theaters | 112,077 |
| http://entertainment.genericnews.com//story.asp?section=913301 | 90,449 |
| http://www.genericnews.com/news/politics/0,1283,64731,00.html?tw=wn_tophead_1 | 78,274 |

FIGURE 33

METHOD AND SYSTEMS FOR CREATING A DIGITAL DOCUMENT ALTERED IN RESPONSE TO AT LEAST ONE EVENT

PRIORITY INFORMATION

This application claims priority to U.S. Provisional Application No. 60/505,956, filed Sep. 24, 2003, and U.S. Provisional Application No. 60/505,960, filed Sep. 24, 2003, the entire contents of which are incorporated herein by reference.

BACKGROUND OF THE INVENTION

1. Field of the Invention

The present invention relates to data processing systems, methods and computer program products for delivering and formatting information.

2. Description of Related Art

The Internet includes a vast number of computers and computer networks that are interconnected through communication links. The interconnected computers exchange information using various services, such as a computer network, electronic mail, Gopher, and the World Wide Web (WWW). The Internet allows a server computer to send digital documents containing information to a user system. That user system can then display, via a browser, the digital documents on a display screen included in, or attached to, the user system. To view a specific digital document, a user system and the browser specify the Universal Resource Indicator (URI) for that document in a request, which can include a Hypertext Transfer Protocol (HTTP) request; that request is then forwarded to the server computer that supports provisioning of that digital document. When that server computer receives the request, it sends that document to the user system. Subsequently, when the user system receives the requested digital document, it typically displays the document in cooperation with the browser.

Conventionally, digital documents are typically defined using code, which provides a standard set of instructions or tags that define how the digital document is to be displayed. This code is typically a source code or object code which can include, but is not limited to, Hypertext Markup Language (HTML), EXTensible Markup Language (EXTML), Dynamic Hypertext Markup Language (DHTML), Java and JavaScript. Thus, when, as above, a user requests that the browser initiate display of a digital document, the browser sends a request to the server computer to transfer to the user system the code that defines the digital document. When the requested code for the digital document is received by the user system, the browser then displays the document in a layout defined by the code. That code contains various tags or instructions that control the layout (i.e., the arrangement of text, graphics, icons, e.g., providing activation of specific tools such as print or electronic mail, images and graphical representations of URI's of other documents available on that server computer or other server computers (e.g., navigational links) and advertisements (e.g., banners).

SUMMARY OF THE INVENTION

A method and system are provided for creating a digital document, including content, layout, additional information, and Altering Machine Executable Instructions (AMEIs), that alter part or all of the content, layout and additional information upon, or subsequent to, at least one request or activation event. The digital document may include content (e.g., text, graphics, images and graphical representations of URIs, activation icons or buttons and advertisements), a layout (e.g., the arrangement of content) and additional information (e.g., instructions which may be implemented by the browser or user system to accomplish specific tasks), and altering machine executable instructions (e.g., tags identifying different types of content and different layouts and instructions for obtaining auxiliary content information and/or auxiliary layout information and altering part or all of the content, layout, additional information, auxiliary content information and auxiliary layout information upon, or subsequent to, at least one request or activation event). The method may include, in response to, or subsequent to, a request or activation event, implementing the altering machine executable instructions, altering part or all of the content, layout, and additional information for the event requested or activated based on the implemented altering machine executable instructions and rendering the digital document for display on or distribution to a user system's rendering device, wherein the altering machine executable instructions may include instructions for applying auxiliary layout information and auxiliary content information prior to altering and rendering of the digital document.

BRIEF DESCRIPTION OF THE DRAWINGS

Embodiments of the invention are described, by way of example only, with reference to the accompanying schematic drawings in which corresponding reference symbols indicate corresponding parts, and in which:

FIG. 33 includes an exemplary format of a data report generated by a rendering tracker component provided in accordance with a tenth embodiment of the invention.

DETAILED DESCRIPTION OF EMBODIMENTS

Figure 1:
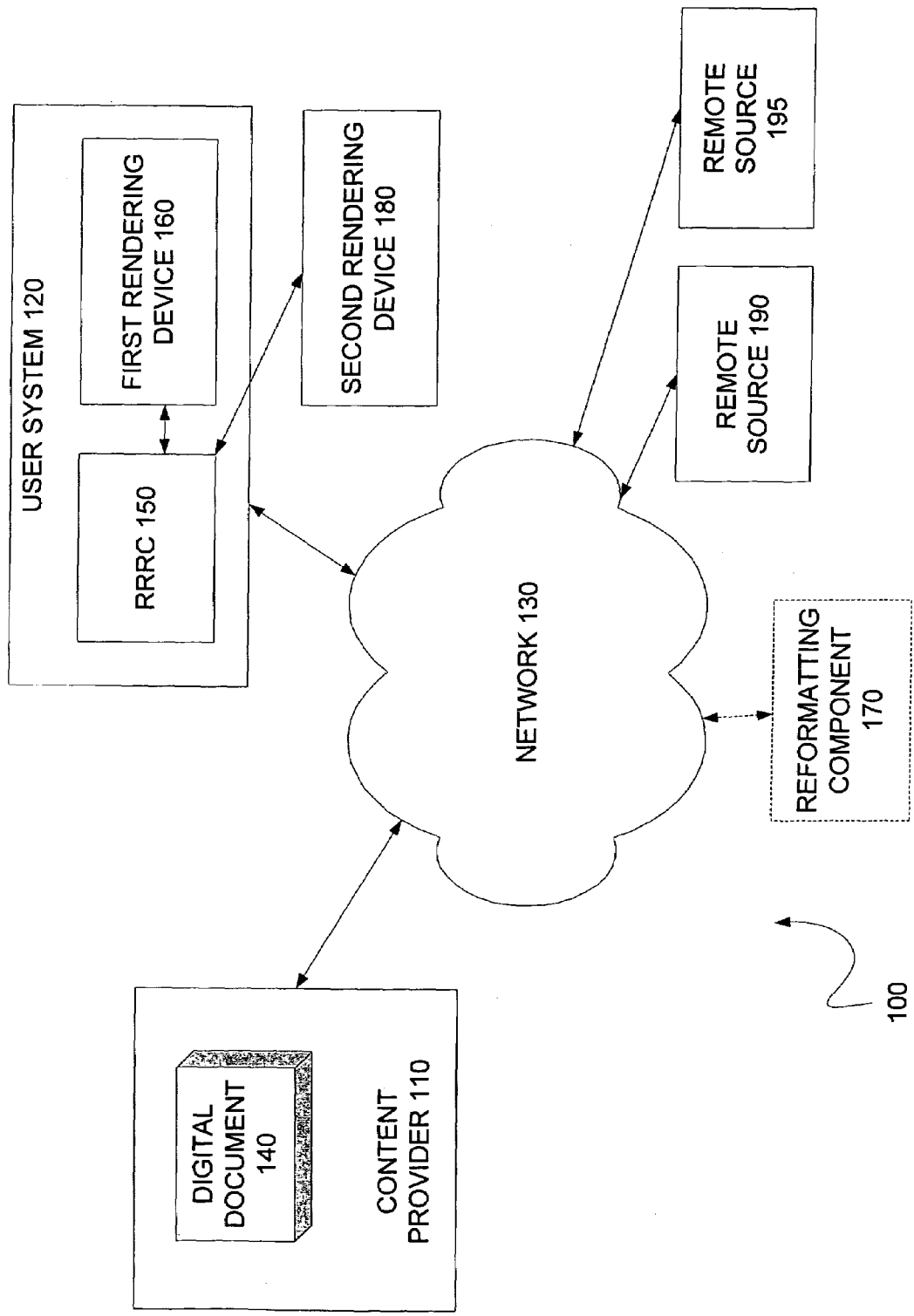
FIG. 1 shows a schematic representation of an environment in which various invention embodiments are implemented.

Many digital documents, such as web pages, are designed for viewing on a typical personal computer screen, a width, in many cases being, for example, 800 pixels. In contrast, the defaults of many printer drivers (i.e., instructions which provide a user system's print subroutine with information on how to parse and render a digital document prior to that digital document being sent to the printer) are set in many cases to a maximum width of less than 700 pixels. This means that, on average, information located on the farthest right side of a computer screen will not be displayed on the resulting printed page(s). In addition, a layout originally utilized for the screen rendering of the digital document is likely to be inappropriate for a printer rendering.

More specifically, a layout originally utilized for a screen rendering of a digital document often contains various types of content including both primary content and secondary content. Primary content, may include, for example, the main information of the digital document (which could include, for example, text of an article of a news web page, driving directions of a mapping web page, or electronic mail text of an electronic mail web page). Secondary content, may include, for example, other information of a document visible on the screen (e.g., navigational links to other documents within a provisioning server, links to other documents outside of the provisioning server, banners and graphical icons, which provide the user access to specific tools, etc). Conventionally, in the typical layout of a digital document viewed on a computer screen, the primary content is typically positioned in the center of the rendering with the secondary content positioned along the top, left, right, and bottom portions of the rendering. In general, since a printer driver, print subroutine, and as a consequence a printer, do not make any distinction between, for example, primary and secondary content, all information visible in the screen rendering is sent to the print subroutine to create the printable file(s), which will be forwarded to the printer for rendering in a print medium. However, generally, when a user requests to print a digital document displayed on a computer screen, the information the user is most interested in viewing on a resulting printed page(s) is the primary content. Nevertheless, conventionally, when the content and layout displayed on the screen is forwarded to the print subroutine, which, in conjunction with the printer driver, subsequently controls the rendering of the printed digital document, the resulting printed pages often have portions of content omitted from the printed pages as well as poor readability in general. In addition, more paper is often required to print the digital document than if only primary content was printed. Further, in many cases, to print an entire digital document, including all the content, the user must change the orientation of the printed pages.

Accordingly, in accordance with various embodiments of the invention, a method is provided for creating a digital document which dynamically alters layout, content and additional information of a digital document, (e.g., that which is included in a web page), and potentially adds auxiliary content information and auxiliary layout information, for rendering in response to a request event or activation event. The digital document may include, for example, content, layout, additional information and altering machine executable instructions and may also, in accordance with at least some embodiments, include auxiliary content information and auxiliary layout information.

In accordance with at least one embodiment of the invention, in response to, or subsequent to, at least one request or activation event, the altering machine executable instructions included in the digital document are implemented and content, layout, and other information included in the digital document are altered for the event requested or activated based on the implemented altering machine executable instructions, which could include instructions for rendering the digital document using auxiliary content information and/or auxiliary layout information for the device or medium rendering the digital document.

Throughout the further explanation of the embodiments of the invention, the term "activation event" broadly refers to one or more activation events, e.g., a print event, electronic mail event, rollover event, or another user activation event including, but not limited to, the activation or excitation of a button or icon included in the digital document, the activation or excitation of a button or icon in a browser, the activation of instructions in a pull-down menu of a browser, etc. Additionally, the term "request event" broadly refers to a request for a digital document to be delivered and displayed on an atypical device, i.e., a device other than a traditional personal computer system's screen, e.g., a Personal Digital Assistant (PDA), a mobile phone, or an unusually shaped computer screen. The term "content" broadly refers to text, graphics, images and graphical representations of URI's of other documents available on one or more server computers (e.g., navigational links), icons (e.g., providing access to specific tools), and/or AMEI icons (e.g., activation buttons to be used to trigger activation events incorporated in the altering machine executable instructions, defined below) and advertisements (e.g., banners). The term "layout" broadly refers to the instructions for placement of content to be rendered prior to a request or activation event. The term "additional information" broadly refers to information or code included in the digital document, other than content, layout, auxiliary content information and auxiliary layout information (e.g., instructions or information which may be implemented by the browser or user system to accomplish specific tasks).

The term "altering machine executable instructions," or "AMEI," broadly refers to content tags (e.g., tags identifying primary content and secondary content), layout tags (e.g., tags identifying which layout is being used to position the content in the digital document), instructions for altering part or all of the digital document (e.g., content, layout, additional information, auxiliary layout information or auxiliary content information) in response to or subsequent to at least one request or activation event and may include instructions for obtaining and rendering auxiliary content information and auxiliary layout information in response to, or subsequent to, at least one request or activation event. Additionally, the term "auxiliary layout information," as used herein, broadly refers to one or more auxiliary layouts and instructions that are designed specifically to dynamically alter the appearance of a web page on a computer screen, but to also maximize the attributes of different mediums, such as a print medium (e.g., pages printed from the screen) or for display on an atypical device (e.g., PDA or mobile phone). This not only includes dynamic elimination of the placement of content which is only useful when viewed on the computer screen (e.g., navigational links and banner ads), but also includes the alteration of the desired content so that it is easy to read (e.g., no cut-off text or graphics) as well as inclusion of auxiliary information designed specifically for the new medium.

Each type of auxiliary layout information is either included in the digital document, but not used for placement of content prior to a request or activation event, or not included in the digital document when originally sent by a digital document provider to a user system (in which case, auxiliary layout information may be subsequently obtained by the AMEI). The auxiliary layout information is then used for placement of part or all of the content and/or part or all of the auxiliary content information upon, or subsequent to, performance of a request or activation event.

The term "auxiliary content information," as used herein, broadly refers to auxiliary content and instructions that are specifically designed for placement by the auxiliary layout information on a new medium, such as the printed page or a PDA, or specifically designed to implement a user requested change to a typical medium like the computer screen. Such auxiliary content could include, for example, advertisements specifically designed for the medium on which those advertisement will be displayed (e.g., dynamic banner advertisements for a computer screen, magazine print advertisements for a printed page, and other medium specific advertising for PDAs and mobile phones). Auxiliary content may also include text from related articles and much more. The auxiliary content is either included in the digital document but not rendered by the layout prior to a request or activation event, or not included in the digital document when originally sent by the digital document provider to the user system (e.g., auxiliary content information that may be subsequently obtained by the AMEI from that digital document provider, obtained from a user's system, or one or more remote sources) which part or all is rendered by the layout or auxiliary layout information in response to, or subsequent to, a request or activation event.

Furthermore, the term "web page" or "digital document" is meant to refer to, but not be limited to, web pages or digital documents residing on servers connected to a communication network, the Internet and web pages or digital documents residing on servers connected to an Intranet and/or Extranet.

A detailed description of at least one embodiment of the invention is now provided with reference to FIG. 1, which illustrates a schematic representation of an environment 100 that includes a digital document provider 110, a user system 120 and a communication network 130, which can be, for example, implemented in whole or part by the WWW. In FIG. 1, provisioning of digital documents 140 (which may be, for example, but not limited to content included on web pages) is supported by the digital document provider 110 (e.g., the originator and/or publisher of the digital documents). It should be understood that the digital document provider 110 may be implemented using one or more servers (e.g., one or more server farms, a hierarchically configured server system where a first server acts as a proxy that receives requests from a number of users and routes the requests to appropriate server(s), etc.).

As illustrated in FIG. 1, a user may access the communication network 130 via the user system 120. The user system 120 may include any type of data processing device resident with a user, e.g., a PDA, a mobile phone, or other computer equipment resident at a user premises including, for example, a personal computer, etc. The communication network 130 may include, among other things, one or more public networks, such as the Internet, and/or one or more private networks often referred to as "Intranets" and "Extranets." A connection between the user system 120 and the communication network 130 may be provided by, for example, a company's communication network, an Internet connection via a modem included in the user system 120 and connected to traditional phone lines, an ISDN link, a T1 link, a T3 link, via cable television, via an ethernet network, etc.; that connection may be made, for example, via a third party, such as an Internet Service Provider (ISP) or wireless network. The connection may be made, for example, either by a direct connection of the client/user to the Internet or indirectly via another, intermediary, device connected to the Internet; in the latter case, the user system 120 may be connected to the intermediary device via a Local or Wide Area Network (LAN or WAN).

A user may access a digital document provided by the digital document provider 110 by establishing a connection, e.g., a TCP connection, between the user system 120 and the digital document provider 110. The user system 120 may communicate with the digital document provider 110 using, for example, HTTP protocol over such a TCP connection, to facilitate data transfer between the user system 120 and the digital document provider 110.

Communication between the digital document provider 110 and the user system 120 may be facilitated via a Requesting, Receiving and Rendering Component (RRRC) 150, which may be, for example, a browser. Thus, using the RRRC 150, the user system 120 may initiate a TCP/IP request for a digital document 140 from the digital document provider 110 and render the digital document 140 on a first rendering device, e.g., display the digital document 140 on a display or screen included in the user system 120. Accordingly, the digital document 140 may include layout, content and additional information that dictate how the RRRC 150 controls rendering of the digital document's content in the specified layout prior to a request or activation event.

Figure 2:
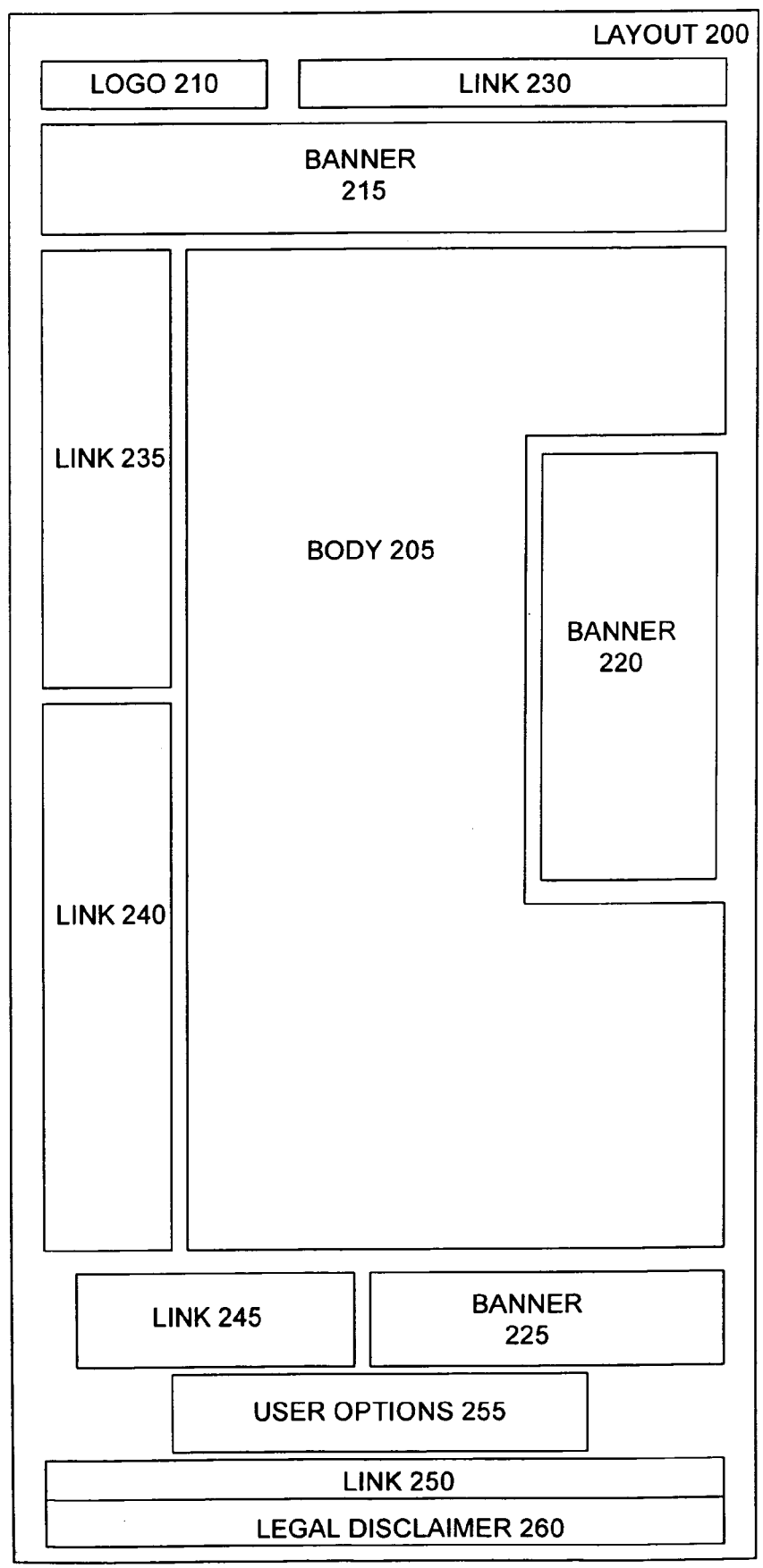
FIG. 2 illustrates an example of a conventional digital document that can be downloaded by a user system via a communication network.

A resulting rendered digital document may include the digital document's content in a format such as that illustrated in FIG. 2. That format includes a layout 200 of various content elements included within the digital document. For example, a layout 200 may include pieces of content such as a body 205 (which may include, e.g., text) and various graphical items such as, but not limited to, a company logo 210, banners 215, 220 and 225, navigational links 230, 235, 240, 245 and 250, user options 255, and a legal disclaimer 260.

The format, and as a result, the layout, of the digital document illustrated in FIG. 2 is based on specific dimensions established by the digital document provider 110, i.e., a specific number of pixels for overall width and height for a particular rendering device, for example, a personal computer screen. More particularly, the layout dictates how the RRRC 150 of the user system 120 should control the rendering of the content of the digital document. This layout is based on certain presumptions regarding the digital document rendering device (e.g., the first rendering device 160 illustrated in FIG. 1).

For example, the layout included in a conventional digital document may, legitimately, be based on the presumption that a rendering device is likely to be a personal computer screen. Thus, the layout may be based on the presumption that the width of a layout 200 should be, for example, 800 pixels, and the height of the layout will be based on the amount of content included in the digital document. However, as mentioned above, conventionally, when a user is interested in printing the content of an accessed digital document following its viewing on the user's personal computer screen, a problem occurs because use of the layout specific to the personal computer screen results in a cluttered or cut off version of that layout and content printed from the user's printer.

Figure 3:
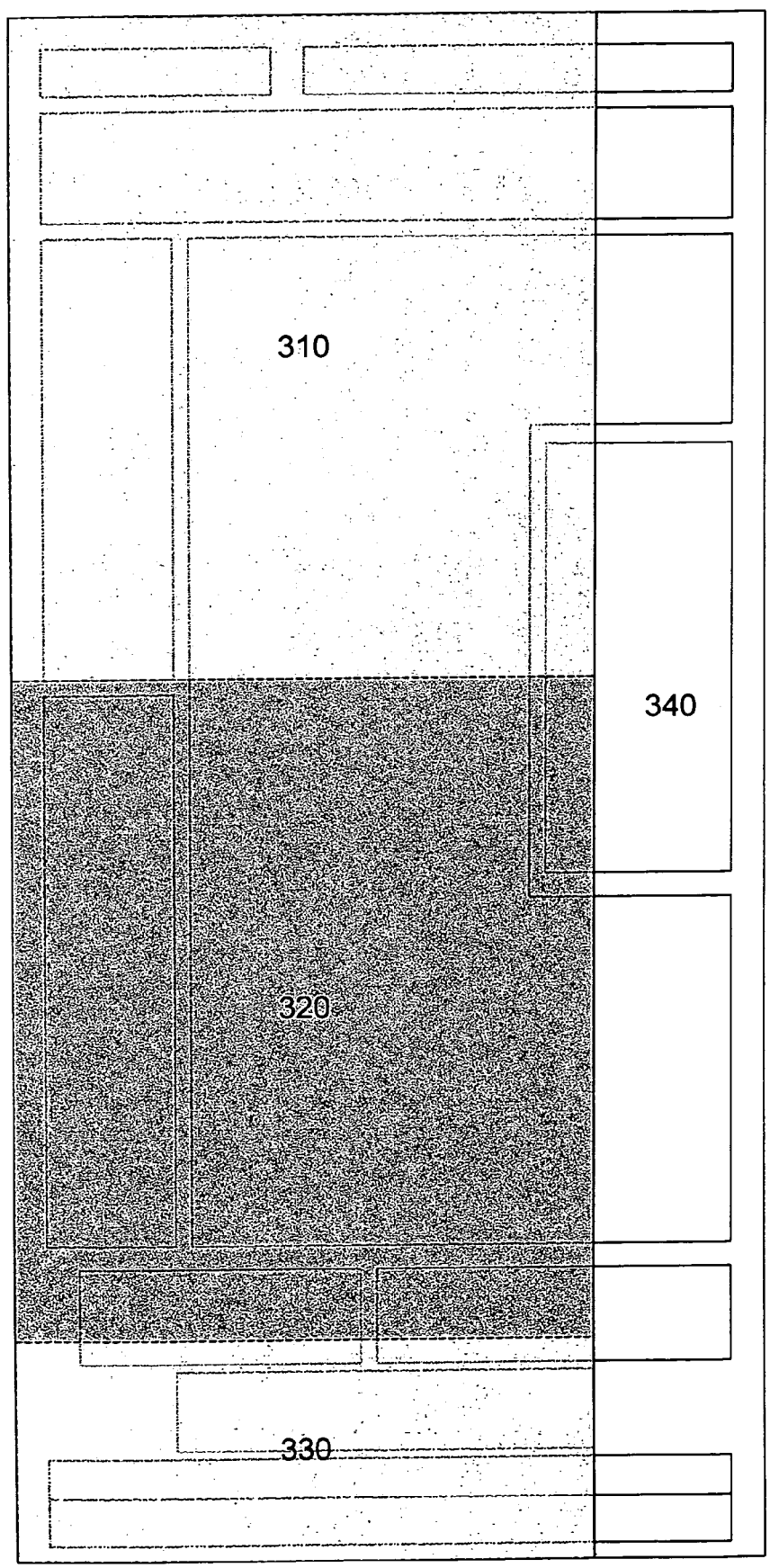
FIG. 3 illustrates portions of the digital document of FIG. 2 parsed for rendering by a rendering device.
Figure 4:
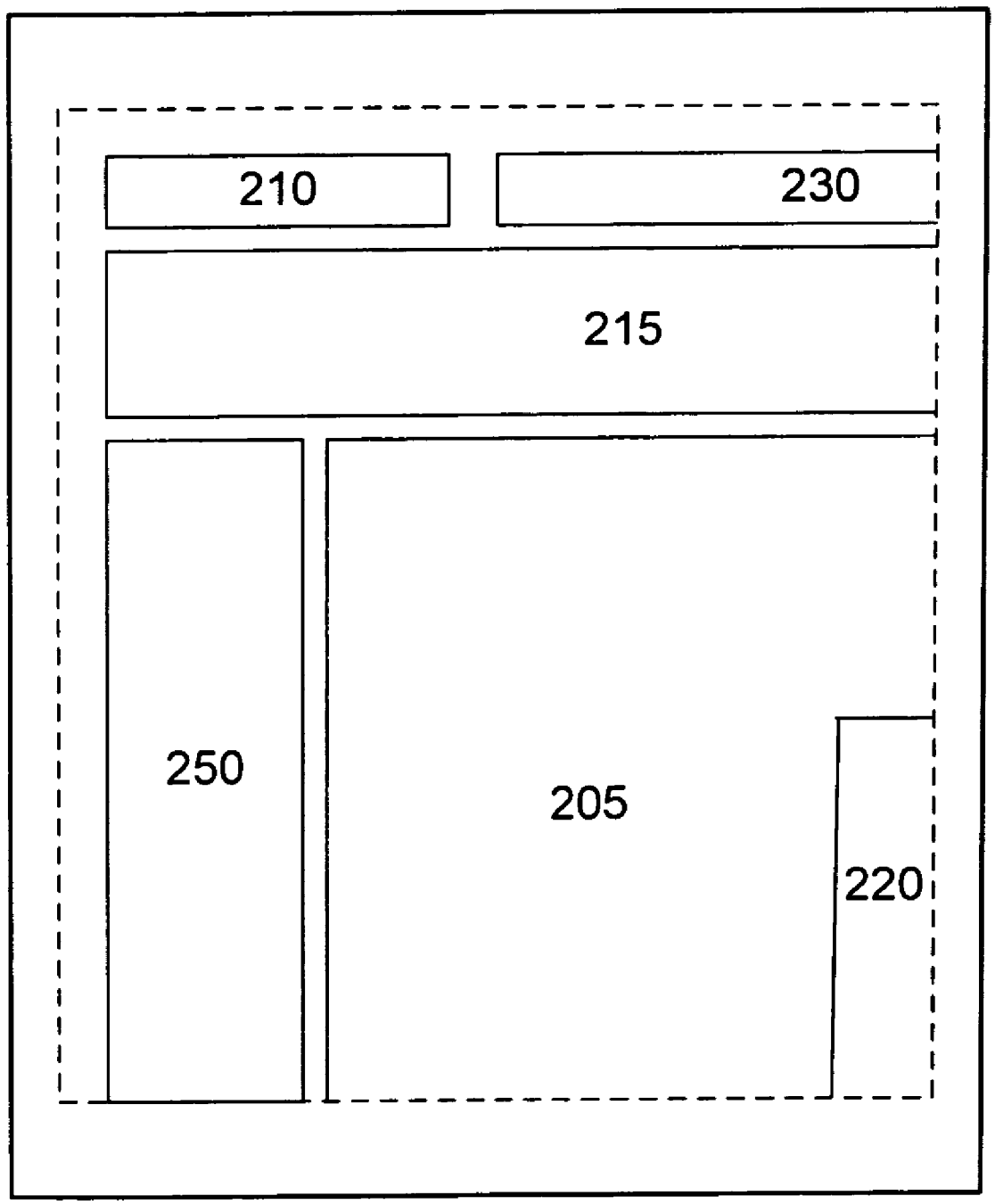
FIGS. 4, 5 and 6 illustrate various parsed portions of the digital document illustrated in FIG. 2, as those portions would be rendered by a second rendering device.
Figure 5:
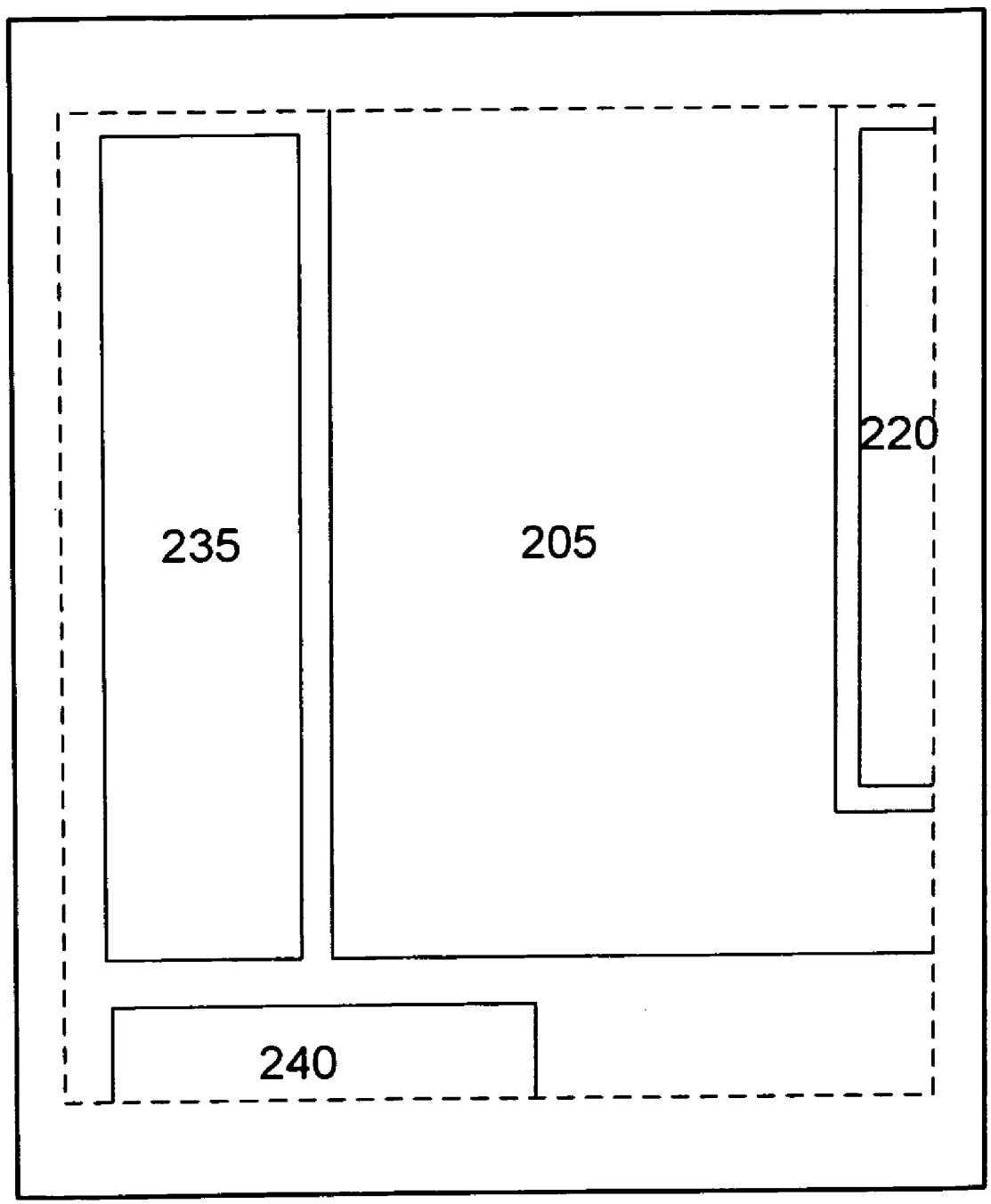

Because, for example, there is most likely a discrepancy between the format appropriate for a personal computer screen and the format appropriate for a printer, a layout information such as the one illustrated in FIG. 2, may be conventionally parsed into various pages, thereby providing a new layout information that is not appropriate for rendering the content information on a printer. For example, as illustrated in FIG. 3, conventionally, a rendering device's control software may parse the content information of the digital document layout information illustrated in FIG. 2 into three separate pages based on the format for the second rendering device. As illustrated in FIG. 3, the first page may include only the content information illustrated in section 310 (illustrated in FIG. 4), second page may include only the content information illustrated in section 320 (illustrated in FIG. 5), and the third page may include only the content information illustrated in section 330 (illustrated in FIG. 6). Any content information in the layout information of the digital document which is wider than the width set by the control software 340 would conventionally go unprinted.

Figure 7:
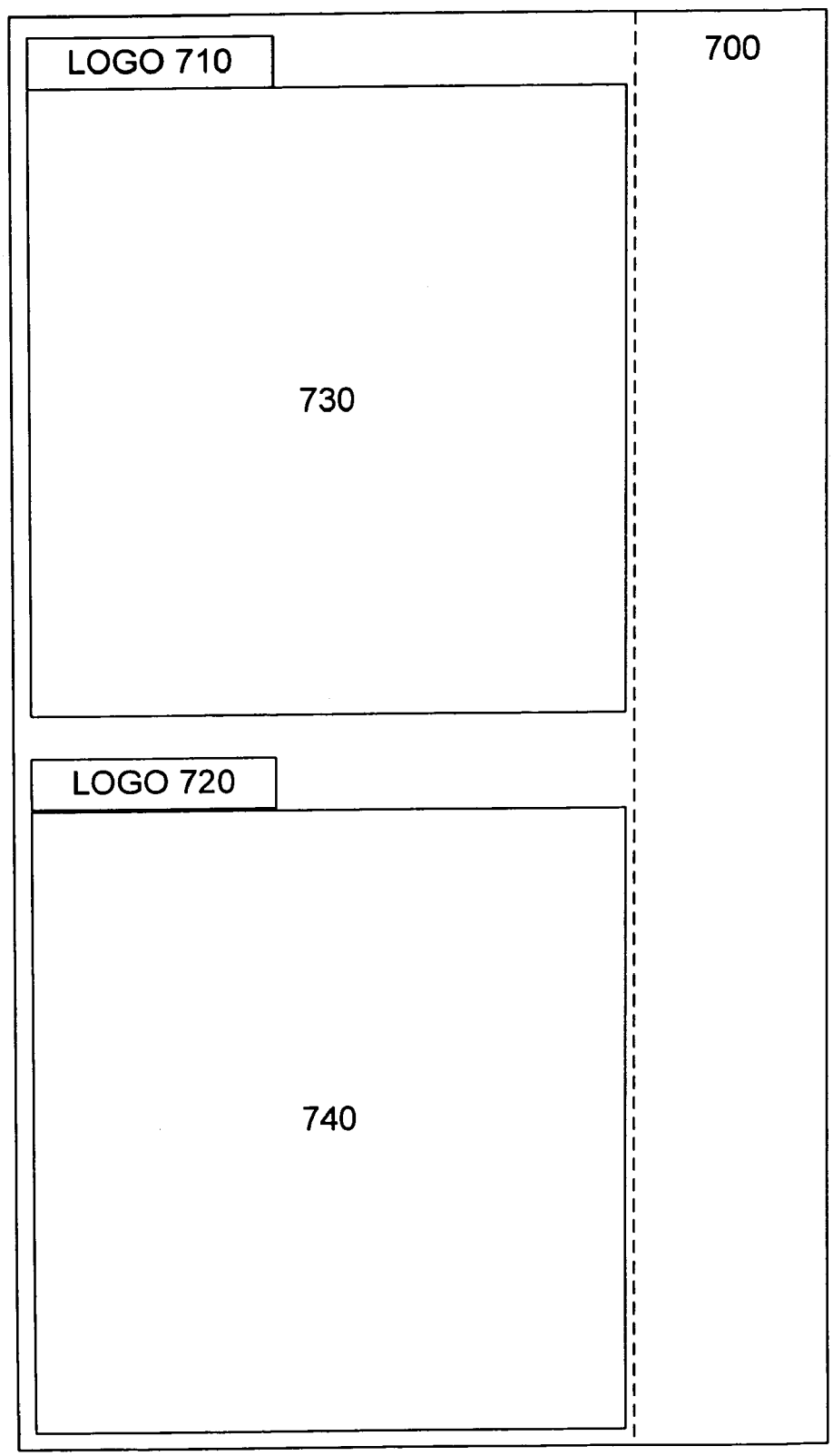
FIG. 7 illustrates at least one auxiliary layout combined with part of the content of the digital document illustrated in FIG. 2, as that digital document may be rendered by a rendering device, in accordance with at least one embodiment of the invention.
Figure 9:
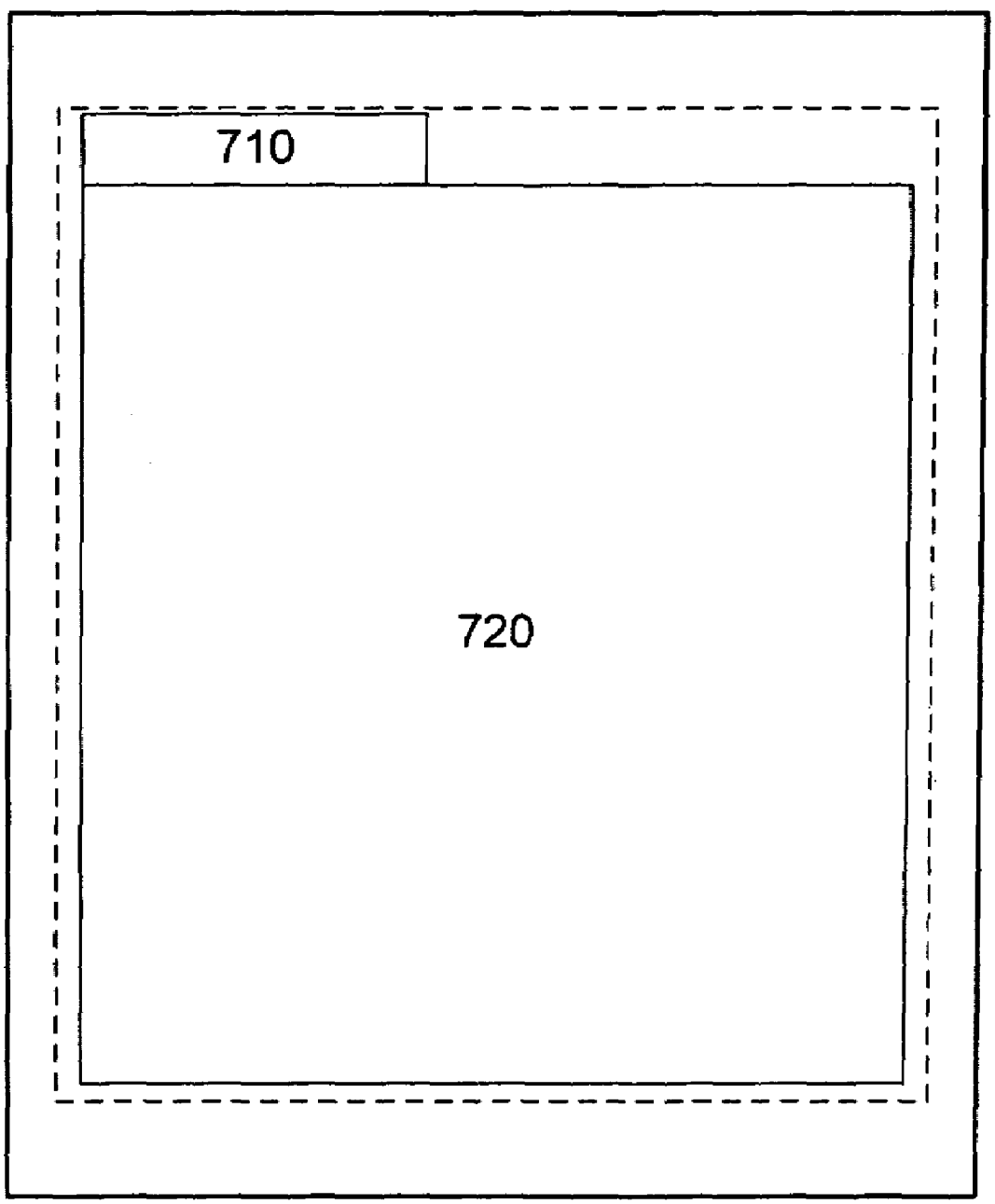
FIGS. 9, 10 illustrate the parsed portions of the digital document illustrated in FIG. 8, as those portions may be rendered by a second rendering device, in accordance with at least one embodiment of the invention.
Figure 10:
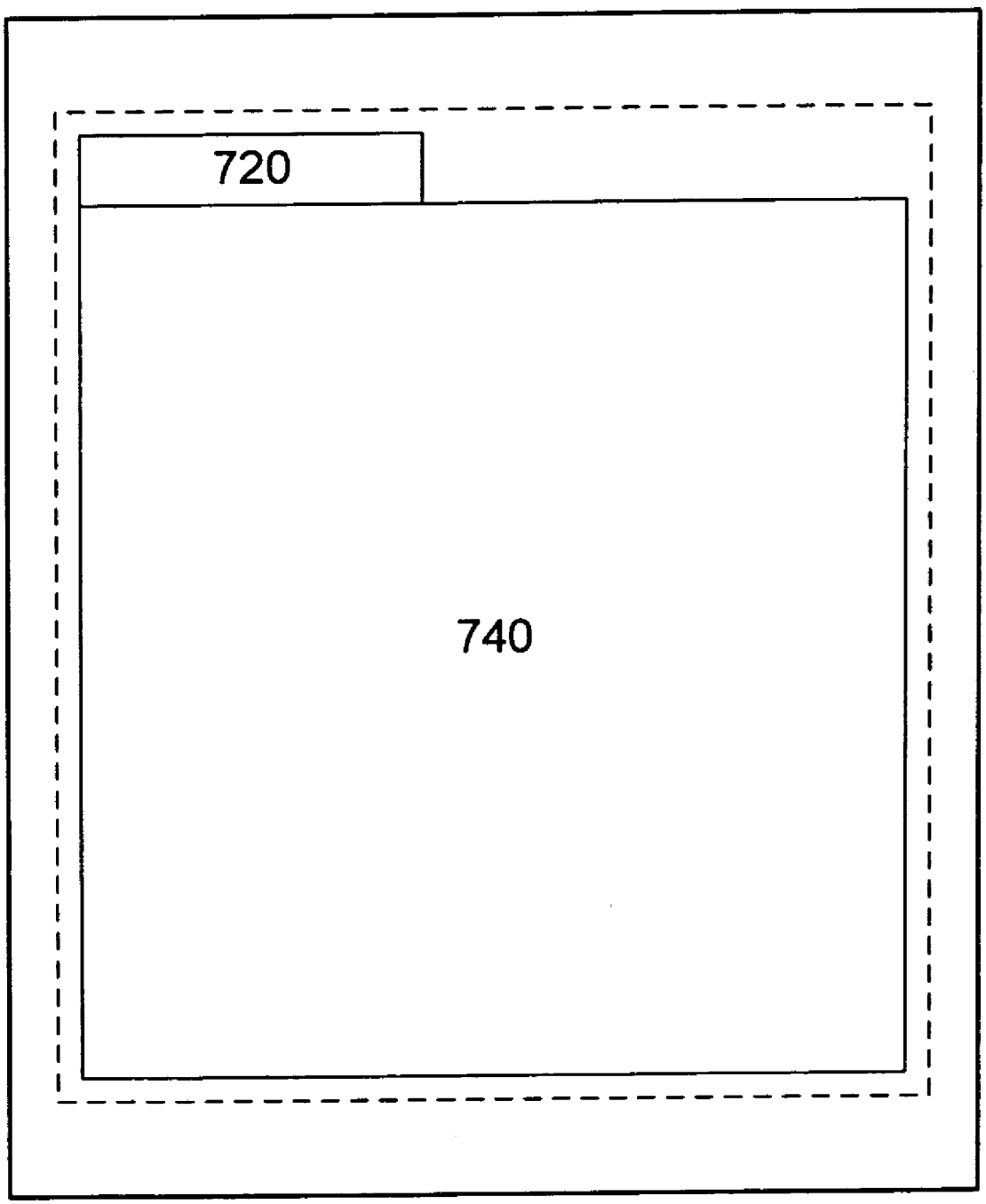

To the contrary, in accordance with various embodiments of the invention (and as explained herein), the AMEI includes instructions associated with the obtaining and/or utilizing auxiliary layout information and may include auxiliary content information that is formulated to be appropriate for a new rendering on the first rendering device 160 or a second rendering device 180 such as a printer. For example, if a user activates a print event, the AMEI included in the digital document automatically obtains or implements auxiliary layout information to the web page transforming the existing web page (FIG. 2) into one which is designed for printing, e.g., FIG. 7. This new layout hides all of the secondary content and positions the important content (e.g., company logo and main body of the page) in a way that when parsed by the print subroutine, e.g., FIG. 8, and printed, the resulting printed pages maximize the attributes of the printed medium, e.g., FIGS. 9 and 10. As illustrated in the figures, there may be, for example, no non-functional navigational links taking up space, no dynamic banner ads which only show on frame on the printed page, no cut-off words or pictures and no printing of an unnecessary third page. Further, the auxiliary layout information can be used to enable advertisers to apply print advertisements to the pages printed from the Internet.

Figure 6:
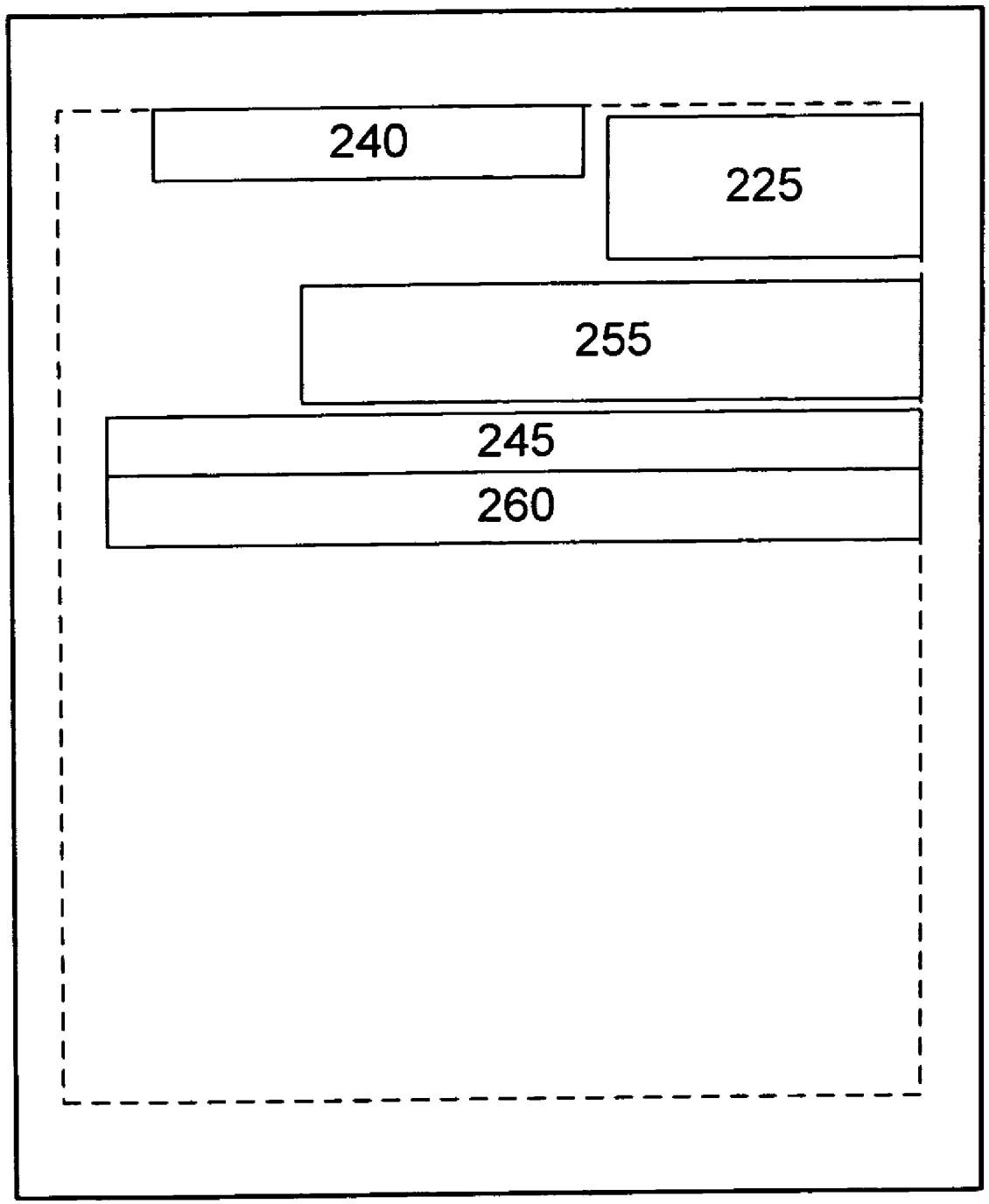
Figure 11:
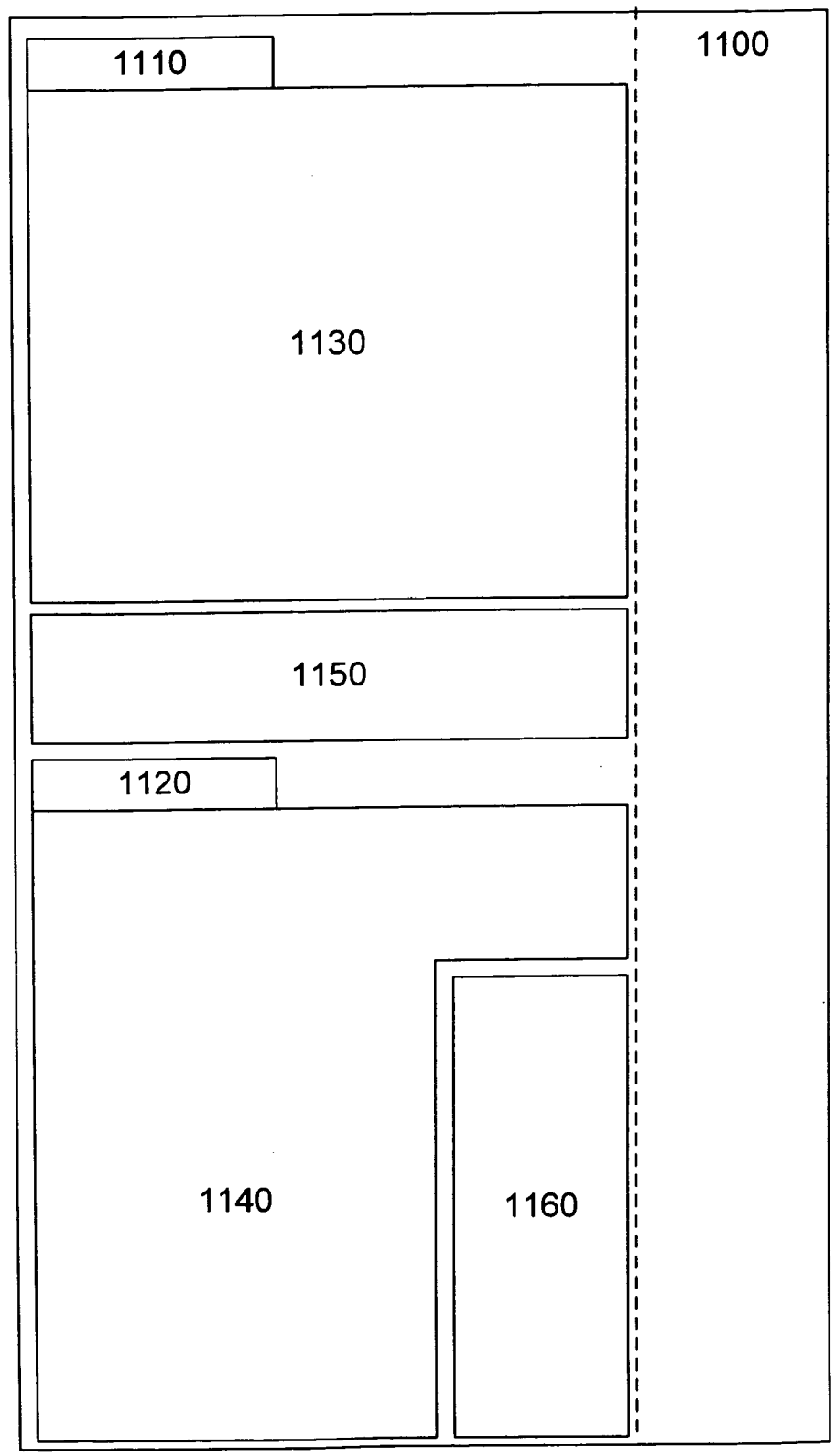
FIG. 11 illustrates one or more pieces of auxiliary content and at least one auxiliary layout combined with part of the content of the digital document illustrated in FIG. 2, as that digital document may be rendered by a rendering device, in accordance with at least one embodiment of the invention.
Figure 12:
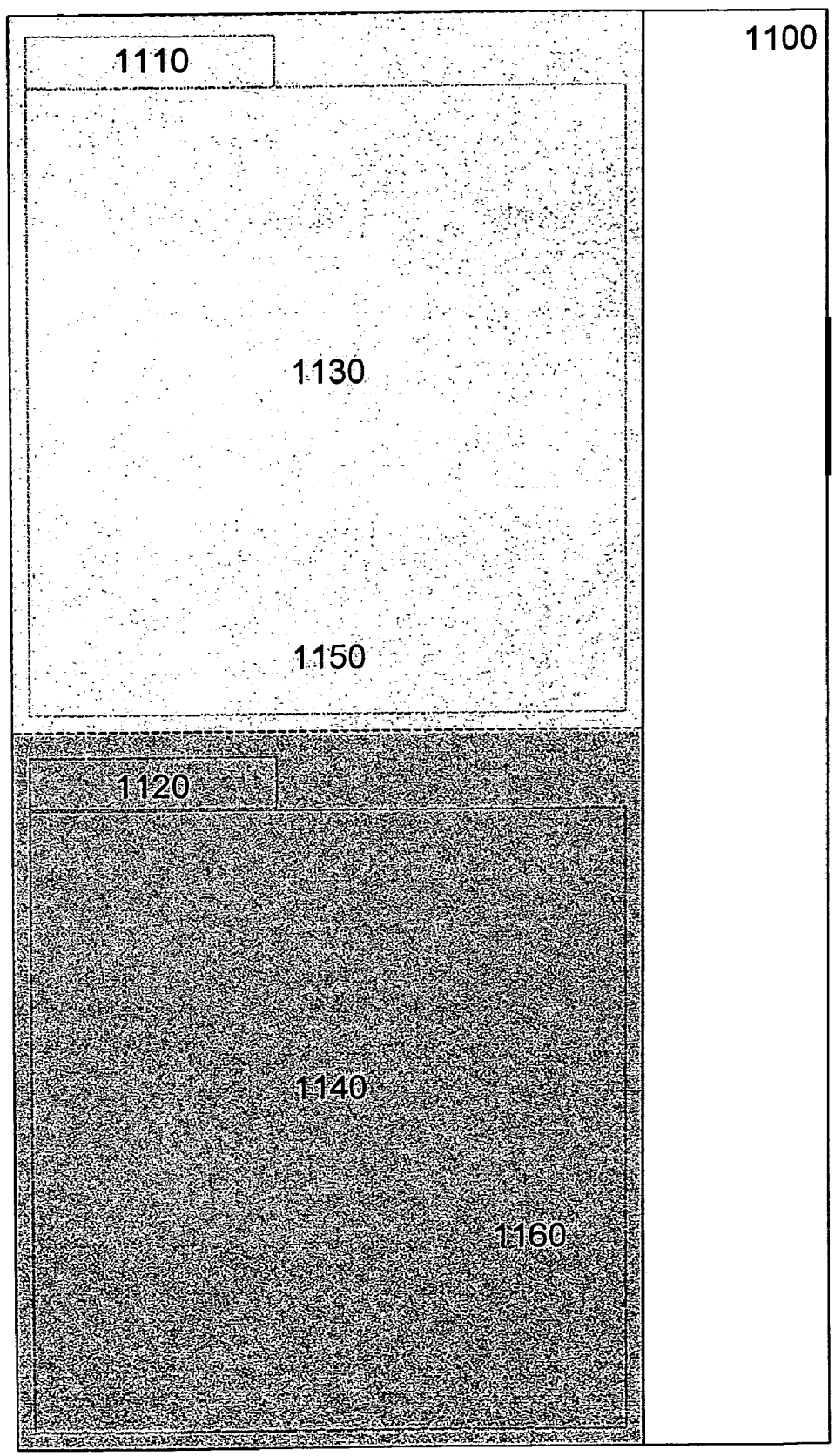
FIG. 12 illustrates the digital document of FIG. 11 as that digital document may be parsed and rendered by a rendering device, in accordance with at least one embodiment of the invention.
Figure 13:
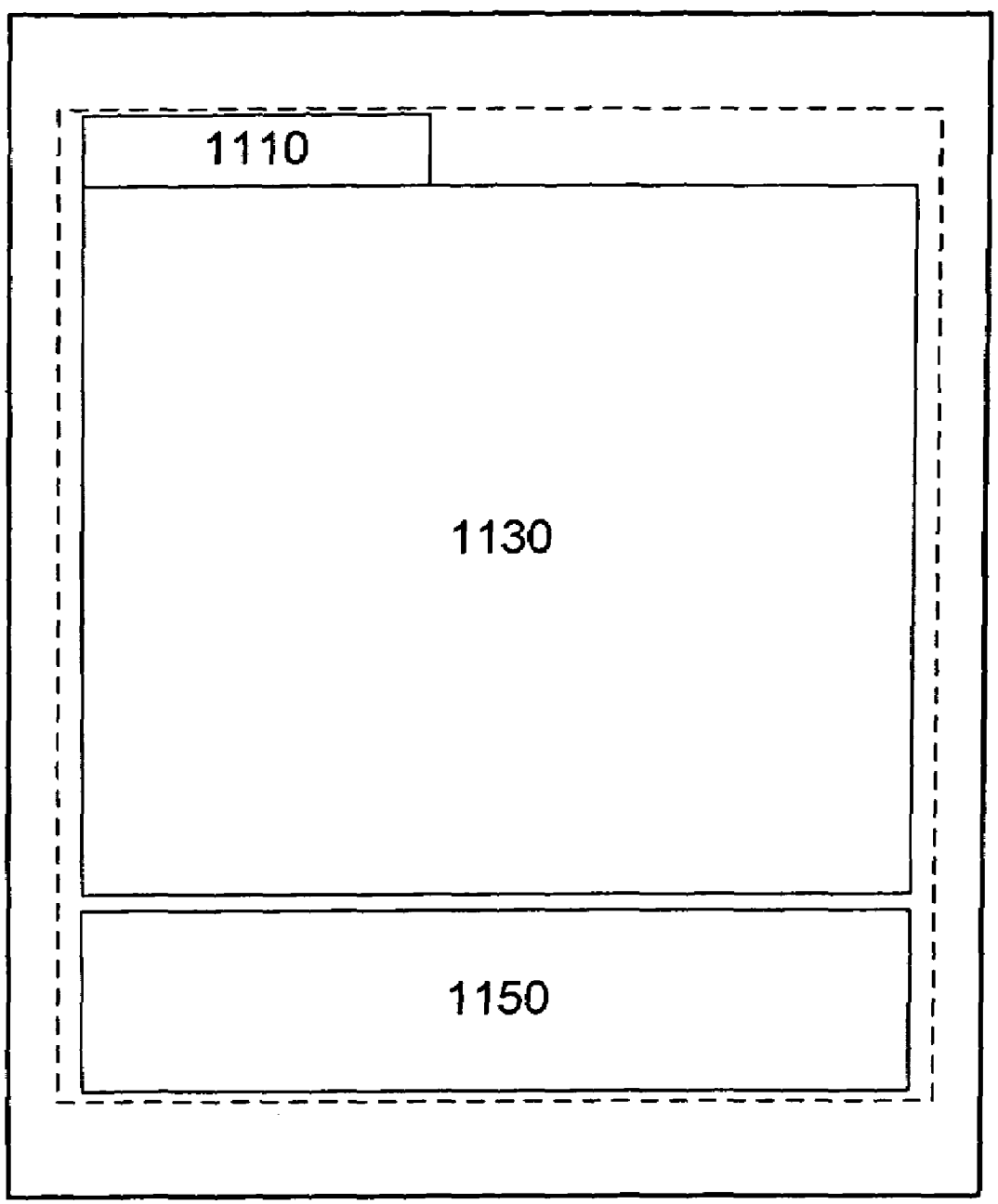
FIGS. 13, 14 illustrate the parsed portions of the digital document illustrated in FIG. 12, as those portions may be rendered by a second rendering device, in accordance with at least one embodiment of the invention.
Figure 14:
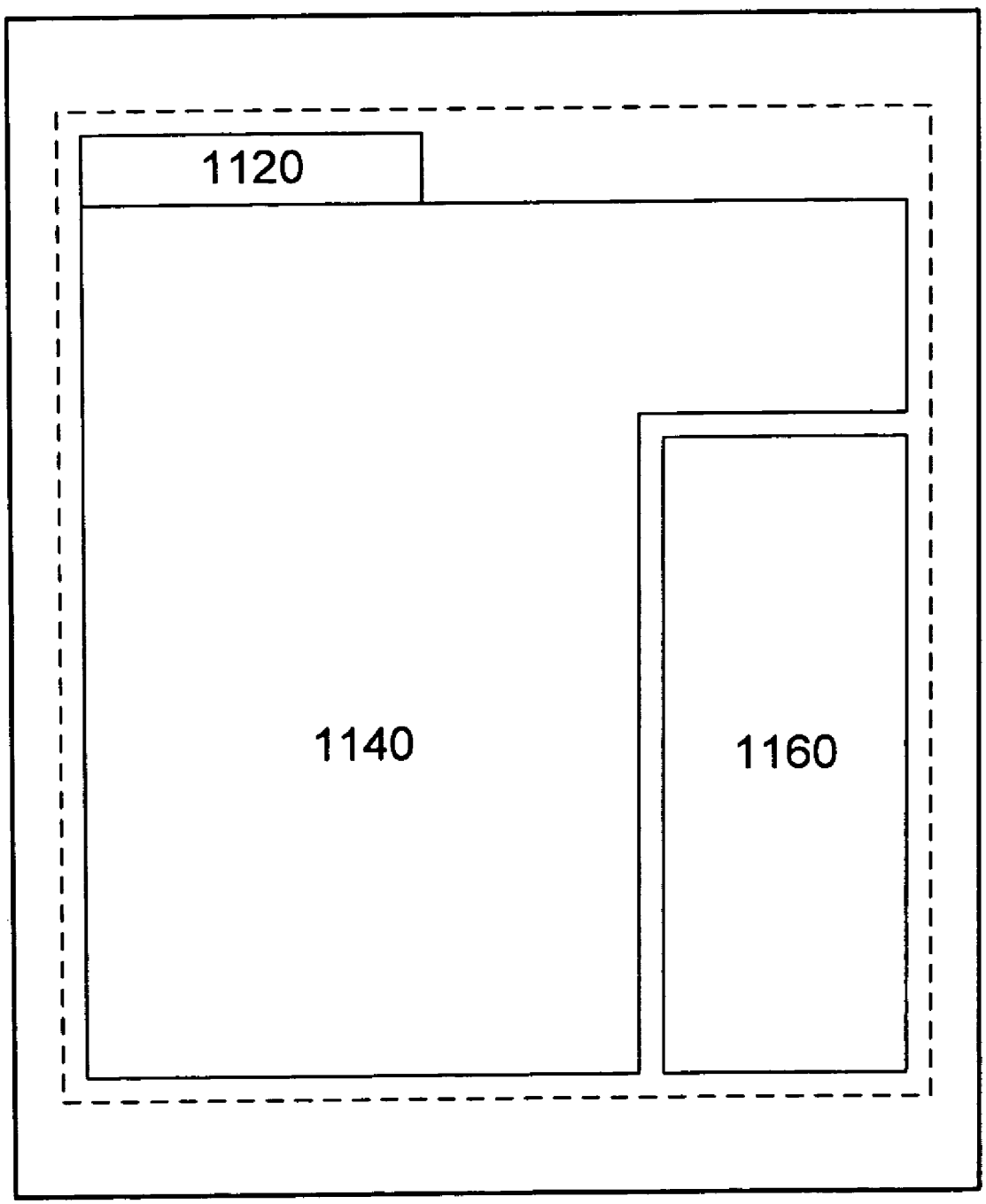

As shown in FIG. 11, dynamic banner advertisements designed for viewing on a screen (for example, banner advertisements 215, 220 and 225 illustrated in FIG. 2) may be replaced with print advertisements 1150 and 1160. As a result, when this layout is parsed by the print subroutine (as illustrated in FIG. 12) and printed (as illustrated FIGS. 13 and 14), the resulting printed pages provide a superior printing experience, elimination of non-functional navigational links and dynamic banner advertisements, elimination of cut-off words and graphics; moreover, the operations performed in association with various embodiments of the invention may eliminate the need to open a "printer friendly" version of a web page and eliminate the printing of conventionally necessary additional pages (such as illustrated in FIG. 6), while enabling advertisers to place one or more print advertisements on each page printed from a web site.

In accordance with various embodiments of the invention (and as explained herein), an AMEI is inserted into each digital document providing instructions associated with the formulation and/or access of one or more auxiliary layouts, i.e., a layout that is formulated to be appropriate for a rendering device such as a printer, PDA or mobile phone rather then the content provider's preferred layout for rendering of content in a format associated with a personal computer screen. The AMEI may trigger formulation and/or access of one or more sets of auxiliary layout information, for example, in response to a request event or activation event. The AMEI provides instructions for the RRRC to automatically and effectively alter and render the digital document so that the control software, for example, that control a second rendering device, such as a print subroutine, which parses the digital document prior to sending the information to a second rendering device (such as the second rendering device 180 illustrated in FIG. 1).

A general explanation of operations associated with processing an activation event, which is a print event, performed in accordance with various embodiments of the invention is now provided with reference to FIG. 1. When a user would like to print content originally rendered on a first rendering device 160, e.g., displayed on their computer screen, on a second rendering device 180, e.g., their printer, the user may instruct the user system 120 to print that content information. Subsequently, the RRRC 150 works in cooperation with software controlling the second rendering device 180 to render that content information. After the second rendering device's control software receives instructions from the RRRC 150 to print the digital document, the control software parses the content information and determines which content information will be displayed on various pages and in what order.

In accordance with various embodiments of the invention, upon execution of a print event, AMEI included in the digital document 140 instruct the RRRC 150 to either access or formulate, depending on the embodiment of the invention (as explained herein), one or more sets of auxiliary layout information for the digital document based on at least one characteristic of the second rendering device 180. This auxiliary layout information is designed to maximize the space provided in the new medium, while eliminating pieces of content not designed for or ineffective in the new medium. It should also be understood that at least one set of auxiliary layout information may be subsequently used to render the content information of the digital document on the first and/or the second rendering devices 160 and 180 rather then the layout information originally used to render the content information on the first rendering device 160.

Subsequent to auxiliary layout information being provided and implemented (either by accessing pre-existing auxiliary layout information or formulating such layout information), the digital document is sent to control software, e.g., a print subroutine, for the second rendering device 180 (e.g., a printer). Subsequently, the RRRC 150 concludes the print event.

The control software then determines how to parse the content and render that content on each printed page; that content information is divided, for example, into what may appear on various pages, taking into account the dimensions associated with the average rendering supplied by a driver, e.g., a printer driver, using the second rendering device, e.g., the content information rendering device's rendering range including, for example, a maximum width of rendered content information. Since the auxiliary layout information is designed for rendering using the secondary rendering device, no content information specified in the auxiliary layout information is cut off or un-rendered.

The control software for the second rendering device 180 then creates a render-able file, which is sent by control software to other control software, e.g., a print subroutine, which forwards it to the second rendering device 180 for rendering. The second rendering device then produces the rendered content information.

Therefore, in accordance with various embodiments of the invention, AMEI are included in the digital document that enable the RRRC 150 to determine how to position the content information of the digital document to be more appropriate for rendering the content information on a printer prior to sending to the control software of a second rendering device (e.g., second rendering device 180, illustrated in FIG. 1).

Accordingly, in accordance with various embodiments of the invention an altering component 170 formulates one or more sets of auxiliary layout information to be appropriate for rendering content information of the digital document on the second rendering device 180. In accordance with various embodiments of the invention, the altering component 170 may reside behind a firewall at the digital document provider 110, at a remote source 190 accessible via network 130 or at the user system 120.

Figure 8:
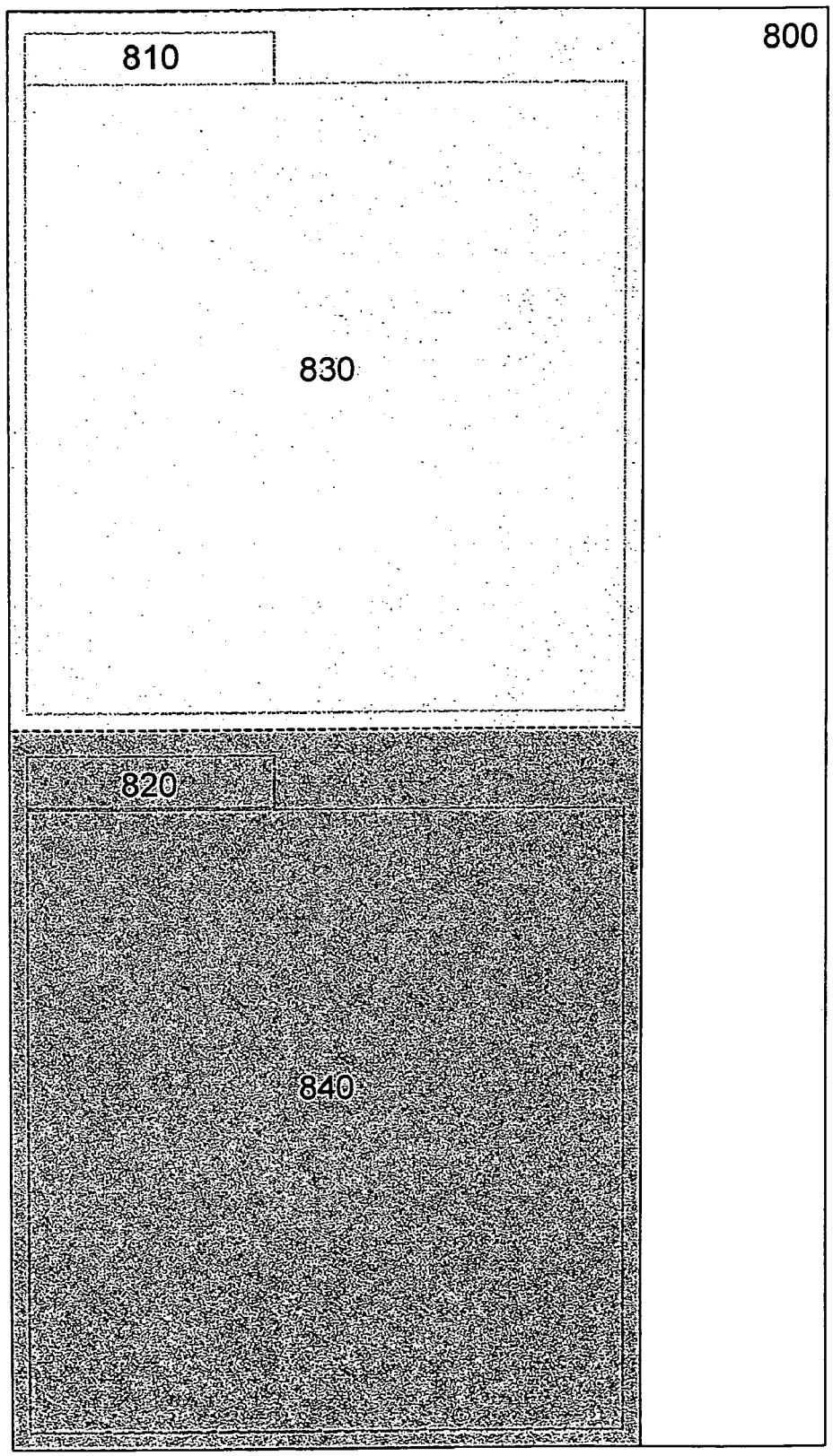
FIG. 8 illustrates the digital document illustrated in FIG. 7, as that digital document may be parsed and rendered by a rendering device, in accordance with at least one embodiment of the invention.

For example, auxiliary layout information, including a layout such as the one illustrated in FIG. 8, may be formulated to allow for rendering of only some of the content information illustrated in the digital document shown in FIG. 2. To facilitate this formulation, the content information included in the digital document may be divided into categories and tagged within the code implementing the digital document accordingly. For example, one such category may be primary content information, which may be displayed in both primary layout information, i.e., the layout information to be used when rendering the content information on either the first or second rendering devices 160, 180. A second category may be, for example, secondary content information, for example, content information which should be rendered by the first rendering device 160, e.g., displayed on a computer screen, but not by the second rendering device 180, e.g., printed. Such auxiliary layout information may be of particular use when a user is interested in printing text of an article included in a digital document but not all of the advertisements, links and legal disclaimer included in that document and displayed when accessing a web site providing that document to display the digital document content information. It should be appreciated that the parsing and tagging of content information of the digital document into various categories may allow omission of, for example, all advertising material and/or functional graphics (e.g., links) that would, obviously, fail to function when rendered in, for example, a print medium.

As can be seen in FIG. 8, this example auxiliary layout information may include rendering of the company logo 210 in a new position 810, 820, and the body 205 in a new position and divided at 830, 840. In this example, secondary content information includes the banners 215-225, the navigational links 230-250, the user options 255 and the legal disclaimer 260.

Additionally, in accordance with various embodiments of the invention one or more sets of auxiliary layout information may incorporate not only the content information provided in the digital document 140 but also auxiliary content information provided by the digital document provider 110 or one or more remote sources 190, 195. This auxiliary content information may include, for example, auxiliary content such as text from related articles, additional details or text to supplement the content information included in the digital document, etc., and/or tertiary content information including, for example, additional or alternative advertising material, etc.

In accordance with at least the first through fifth embodiments of the invention, the method and system are designed to particularly handle one specific type of user activation event, a print event. Those embodiments provide for various methods of creating and distributing one or more digital documents (e.g., web pages) that are designed to maximize the attributes of a typical computer screen when viewed on a computer screen, but when printed, are dynamically altered and rendered to maximize the attributes of the print medium prior to sending the information to the control software of the printer and then switched back to an original screen maximizing condition in a fashion that may be so rapid, the entire process may be unnoticeable to the user. This event may be automatically activated by the user activating or exciting an icon or button on the digital document, activating a print button on their browser or activating the print function from a pull-down menu (i.e., there is no need to open a "printer friendly" version of the digital document).

The result may be the creation of a digital document that takes advantage of the attributes of the computer screen when the content may be rendered on the computer screen and takes advantage of the attributes of the printed page when the content may be rendered on the printed page. This approach also allows for utilization of appropriate advertising for each medium, e.g., dynamic banner advertisements to attract a users attention while viewing content on a computer screen and static print advertisements such as those in a magazine for viewing on a printed page.

Although at least the first five embodiments may automatically revert back to an original layout, content and additional information once a newly rendered document has been sent to a secondary rendering device control software, it should be understood that different auxiliary layout information and/or auxiliary content information may be applied to the digital document to be rendered on the first rendering device subsequent to the completion of the event. Thus, in accordance with at least a sixth embodiment, the AMEI not only instructs creation and rendering of a new version of a digital document upon an event, but also creation and rendering of a different version of the digital document upon the conclusion of that event.

At least a seventh embodiment relates particularly to one specific type of user activation event, an activation or excitation of a button on a screen which triggers altering the appearance of the original layout, content and additional information of a digital document when viewed on the computer screen in a fashion desired by the user of the digital document. At least this embodiment provides a method of creating and distributing one or more digital documents (e.g., web pages) that are designed to maximize the attributes of a typical computer screen when content may be rendered on a computer screen, and, when a certain icon or button is activated or excited by a user, the digital document may be dynamically altered to meet the needs of the user. This may provide a mechanism for the creation and distribution of a digital document that originally takes advantage of a digital document creator's or distributor's preferred layout for viewing on a computer screen, but also allows a user to alter the display (without opening a new page) to meet his particular needs. This feature may hide certain pieces of content or change the original layout to allow for space for a text box to be inserted into the page for the user to type notes or comments prior to saving the digital document, printing the digital document or transmitting the digital document via electronic mail.

In accordance with at least the eighth and ninth embodiments, methods and systems are provide that handle a specific type of request event and allow for the creation and distribution of one or more digital documents, which are designed to maximize the attributes of a computer screen, but when requested to be sent to an atypical user device (e.g., a PDA, mobile phone, etc.), the digital document is dynamically altered to best take advantage of the attributes of the atypical user device. This event may be automatically activated by a user request for the document to be sent to the atypical user device (i.e., there may be no need to obtain a PDA friendly version of a digital document). One potential utility of this particular embodiment may be the creation of a digital document that takes advantage of the attributes of the computer screen when viewed on the computer screen and takes advantage of the attributes of the atypical user device when viewed on such a device. As a result, in accordance with at least this embodiment of the invention, appropriate advertising may be included for each medium, e.g., dynamic banner advertisements for viewing on a computer screen and advertisements specially designed for the resolution and screen dimensions of atypical user devices.

In accordance with at least a tenth embodiment of the invention, a method and system are provided for tracking the usage of each of the other embodiments (one through nine).

In accordance with at least a first embodiment, a method of creating and distributing a digital document (e.g., a web page) may be provided for viewing the document on a computer screen, and, upon a certain user activation event (e.g., electing to print the digital document, regardless of the method used to activate the print event, for example, activating a print button on the digital document, activating a print button on the browser or activating the print function of a pull-down menu of the browser) the digital document may be automatically altered to take advantage of the attributes of the print medium. Subsequently, once the newly rendered document may be forwarded for printing, the digital document reverts back to its original screen appearance. This process may be so rapid that it may be virtually unnoticeable by the user.

Figure 15:
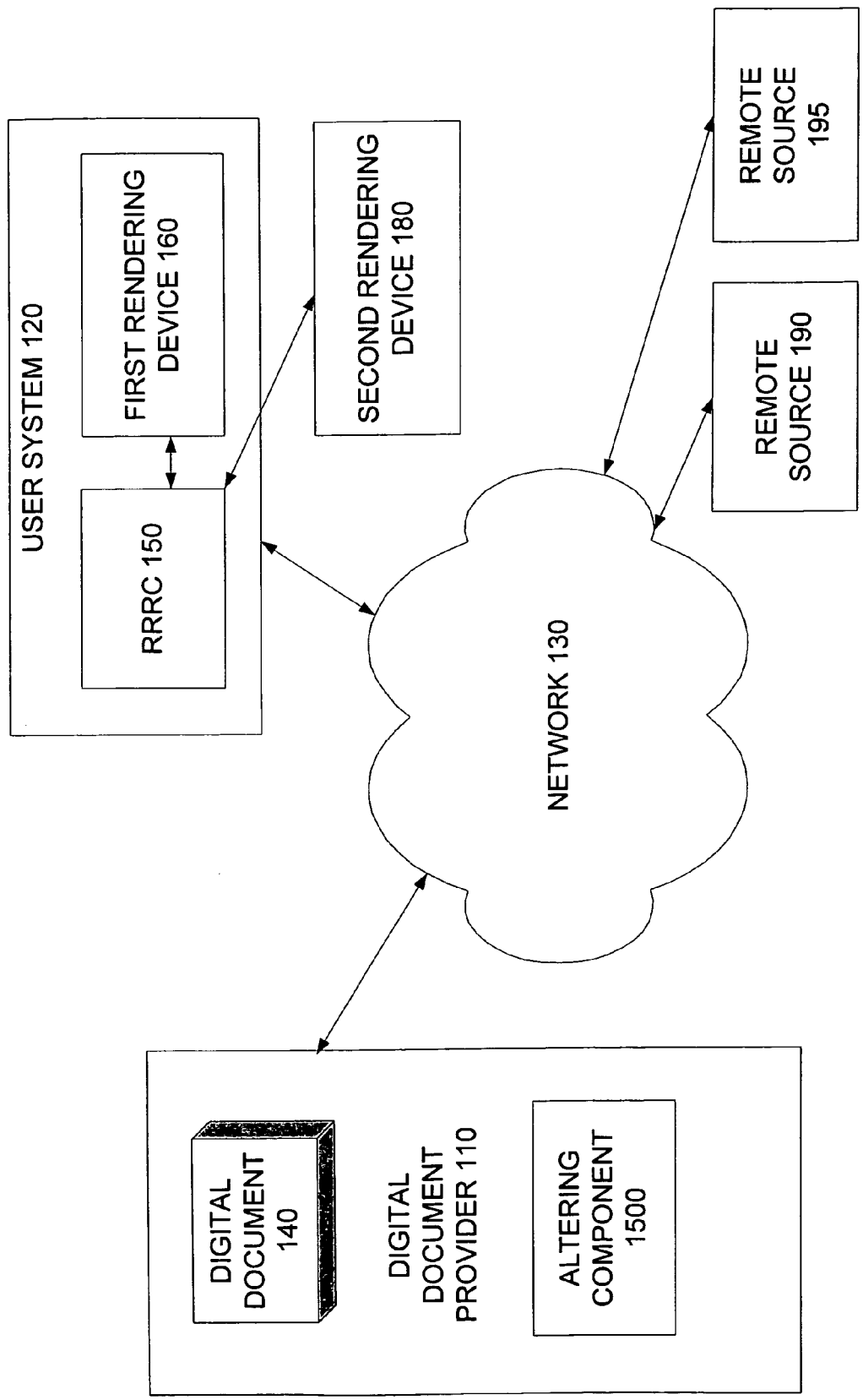
FIG. 15 shows a schematic representation of an environment in which at least a first embodiment may be implemented.

As illustrated in FIG. 15, in accordance with at least this first embodiment, the altering component 1500 may be resident at the digital document provider 110, for example, behind a firewall and/or with protection from other security mechanisms provided by the digital document provider 110. One or more sets of auxiliary layout information may be created by the altering component 1500 and included, but hidden, in the digital document 140. One or more sets of auxiliary content information may be created by the altering component upon a request from the RRRC 150, and the digital document provider 110 sends the digital document 140 to the RRRC 150. The digital document 140 may then be displayed on the first rendering device 160 using the content, layout and additional information.

In response to an activation event, which involves sending the digital document 140 to a second rendering device 180 (e.g., a print event), the AMEI determines the appropriate auxiliary layout information contained within the digital document 140 and instructs the RRRC 150 to request, if needed, auxiliary content information from the digital document provider 110, at least one remote source 190, 195 and/or from within the user system 120. Once all the information is received by the RRRC 150, the AMEI instructs the RRRC 150 to alter the digital document 140 using part or all of the content, layout, additional information, auxiliary layout and auxiliary content. The AMEI then instructs the RRRC 150 to forward the render-able file to the control software included in the user system 120 and associated with the second rendering device (e.g. print subroutine and printer driver). That control software, in turn, parses and creates a render-able file of the new version of the digital document 140 which may be forwarded to the second rendering device 180 (e.g., the printer), as explained above. The second rendering device 180 then renders the digital document 140 in the new medium (e.g., in print) using the layout and content previously designated by the AMEI and auxiliary layout information.

In accordance with at least this embodiment, the altering component resident at the digital document provider may formulate one or more sets of auxiliary layout information (to be used by the AMEI upon the activation of different activation events) for the digital document prior to that digital document being requested by the RRRC 150.

Figure 16:
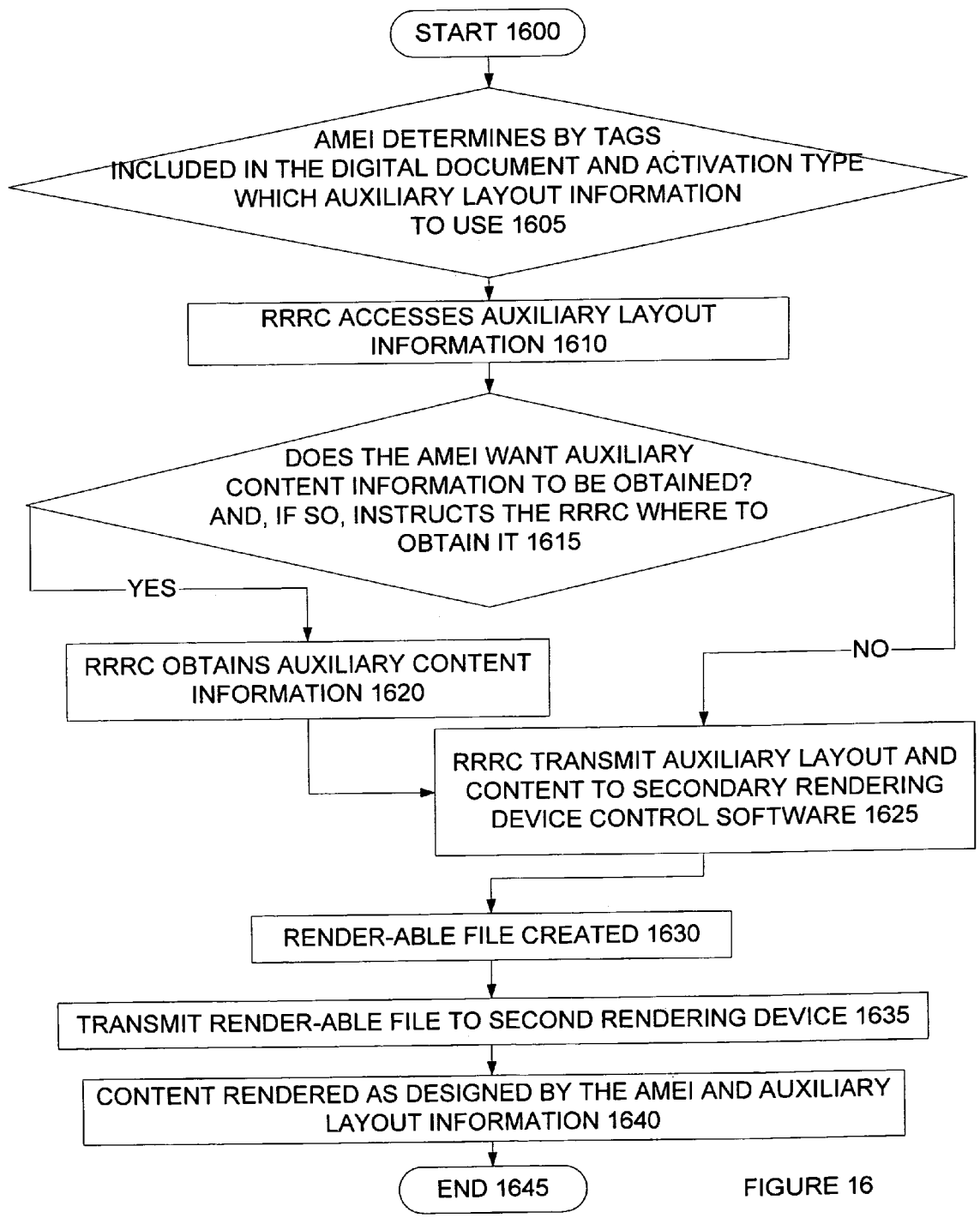
FIG. 16 illustrates operations associated with at least a first embodiment.

Therefore, as illustrated in FIG. 16, various operations occur following the user activating an event which sends the digital document to a second rendering device, e.g., a print event. The operations begin at 1600 and control proceeds to 1605, at which, the AMEI uses the tags included in the digital document and the event which is being requested to determine the appropriate auxiliary layout which should be applied. Control proceeds to 1610 and the AMEI instructs the RRRC to access the appropriate auxiliary layout information included in the digital document. Control then proceeds to 1615 and the AMEI determines if auxiliary content information is required and, if it is needed, from where the RRRC should obtain the auxiliary content information. If no auxiliary content is needed, control proceeds to 1625. If auxiliary content information is needed, control proceeds to 1620, at which point the RRRC (through instructions from the AMEI) obtains the appropriate auxiliary content information (for example, by communicating with the digital document provider who originally provided the digital document, communicating with a remote source, e.g., one or more servers, and/or accessing auxiliary content information located in the user system).

Subsequently, control proceeds to 1625, at which point the AMEI instructs the RRRC to alter the digital document given the new information and transmit the digital document to the control software associated with the second rendering device and control proceeds to 1630. At 1630, the control software for the second rendering device determines how to parse and render the new version of the digital document according to the software associated with the second rendering device (e.g., a print subroutine and printer driver) and a render-able file may be created. Control then proceeds to 1635, at which point the render-able file may be forwarded to the second rendering device for rendering. Subsequently, at 1640, the second rendering device receives the information and renders the digital document in the new medium, e.g., printed pages, using the appropriate pieces of layout, content, additional information, auxiliary layout information and potentially auxiliary content information previously designated by the AMEI and auxiliary layout information. Control then proceeds to 1645, at which operations associated with processing the event ends.

It should be understood that immediately upon forwarding the newly rendered digital document to the control software associated with the second rendering device 1635, the AMEI can be programmed to hide the auxiliary layout information and auxiliary content information, if included, and unhide, or display, all of the components of the original digital document (e.g., layout, content and additional instructions). As a result, it may appear to the user as if the digital document viewed on the screen has gone unchanged as the change to the new version and the change back to the old version may be so rapid that the web page on the screen appears to never have been performed.

In accordance with at least a second embodiment of the invention, a method of creating and distributing a digital document (e.g., a web page) may be provided for viewing the digital document on a computer screen, and, upon a certain user activation event (e.g., electing to print the digital document regardless of the method used to activate the print event, for example. activating or exciting a print button on the digital document, activating or exciting a print button on the browser or activating the print function of a pull-down menu of the browser) the digital document may be automatically altered to take advantage of the attributes of a print medium. Subsequently, once the newly rendered document may be forwarded for printing, the digital document reverts back to its original screen appearance. This process may be so rapid that it may be virtually unnoticeable by the user.

Figure 17:
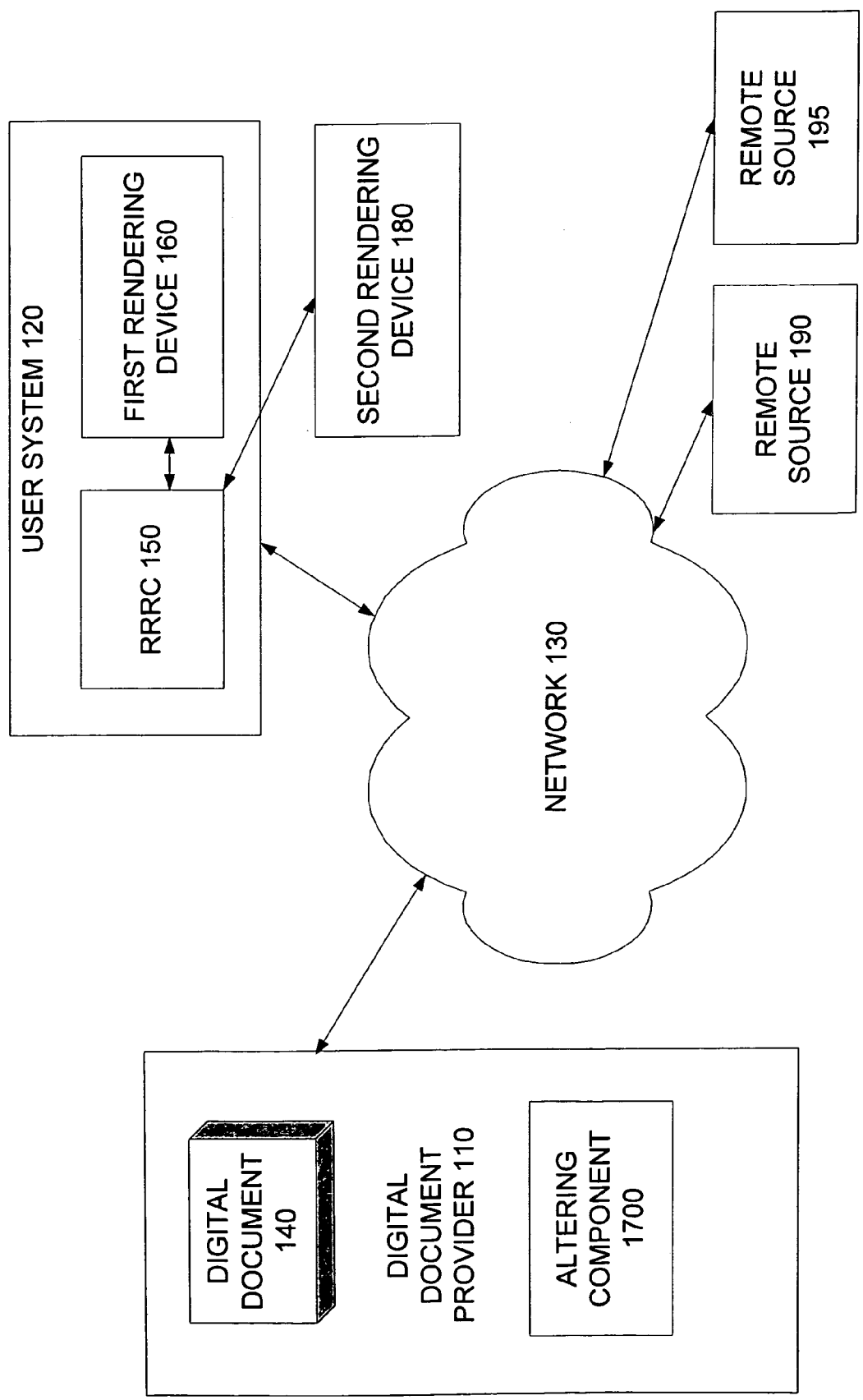
FIG. 17 shows a schematic representation of an environment in which at least a second embodiment may be implemented.

In accordance with at least the second embodiment of the invention, and as illustrated in FIG. 17, the altering component 1700 may be resident at the digital document provider 110, for example, behind a firewall and/or with protection from other security mechanisms provided by the digital document provider 110. The necessary auxiliary content information and/or auxiliary layout information may be provided by the altering component 1700 for specific request or activation events and stored in the altering component 1700 or within the digital document provider 110 until requested. In response to an activation event (e.g., a print event), the AMEI instructs the RRRC 150, to request from the altering component 1700 the appropriate auxiliary layout information needed to render the digital document for the activated event. Upon receiving the appropriate auxiliary layout information, the AMEI determines if a set of auxiliary content information is needed. If it is needed, the AMEI instructs the RRRC to obtain the appropriate set of content information (which could be from the digital document provider 110, the altering component 1700, one or more remote sources 190, 195 and/or from within the user system 120). Once all the information is received by the RRRC 150, the AMEI instructs the RRRC 150 to alter the digital document 140 using part or all of the content, layout, additional information, auxiliary layout and auxiliary content. The AMEI then instructs the RRRC 150 to forward the render-able file to the other software included in the user system 120 and associated with the second rendering device (e.g., print subroutine and printer driver), which, in turn, parse and create a render-able file of the new version of the digital document 140 which is forwarded to the second rendering device 180. The second rendering device 180 then renders the digital document 140 in the new medium (e.g., print) using the layout and content previously designated by the AMEI and auxiliary layout information.

In accordance with at least this second embodiment, the altering component resident at the digital document provider may formulate one or more sets of auxiliary layout information for the digital document prior to that digital document being requested by the RRRC 150. However, in contrast to at least the first embodiment of the invention, at least the second embodiment of the invention may not include auxiliary layout information in the digital document transmitted to the RRRC 150 in response to its initial request.

Figure 18:
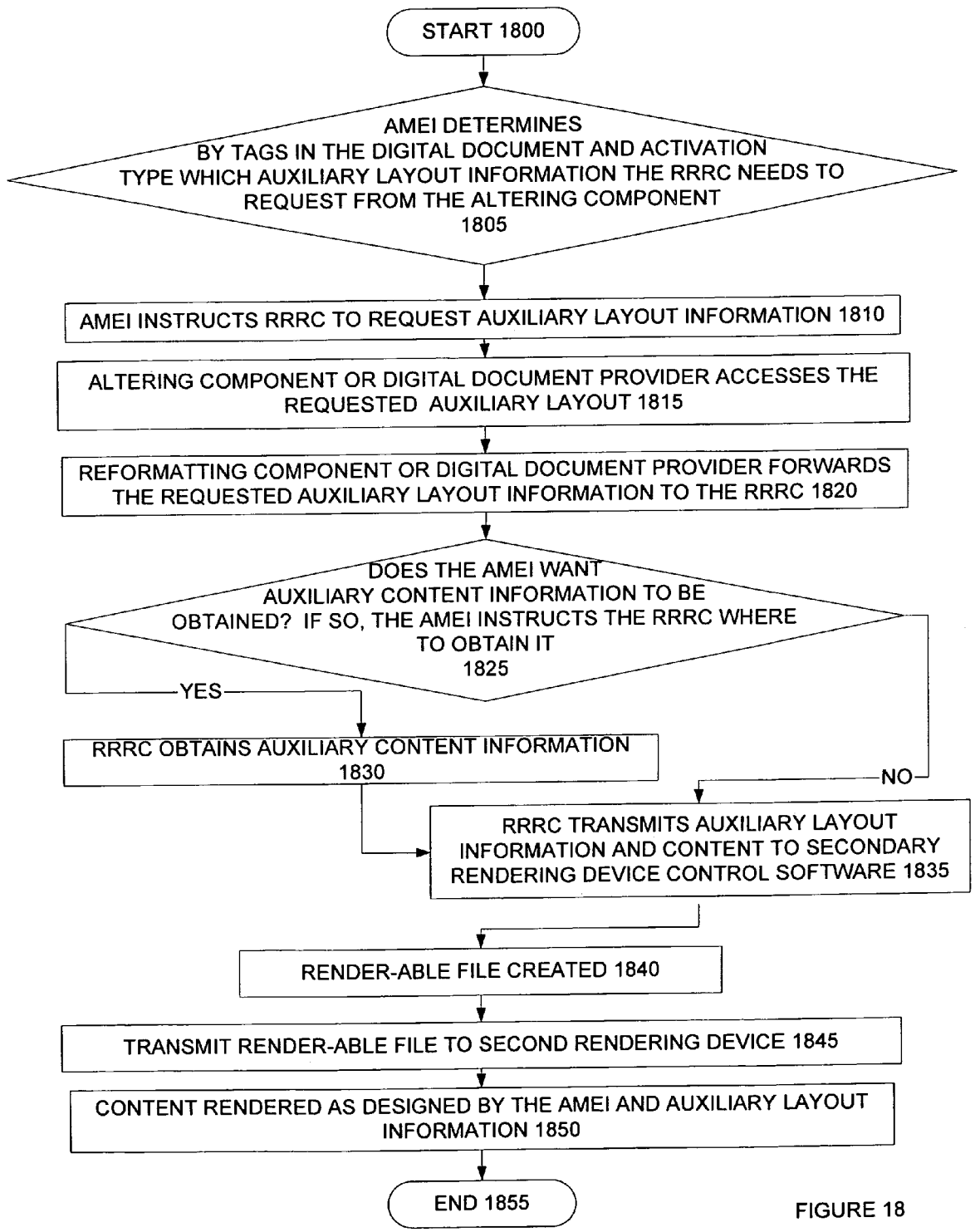
FIG. 18 illustrates operations associated with at least the second embodiment.

Therefore, as illustrated in FIG. 18, various operations occur following the user activating an event, e.g., a print event. The operations begin at 1800 and control proceeds to 1805, at which, the AMEI included in the digital document determines the appropriate auxiliary layout information given the tags contained in the digital document and the activation event requested. Control then proceeds to 1810, at which point the AMEI instructs the RRRC to request the appropriate auxiliary information from the altering component or the digital document provider. Control proceeds to 1815, at which the altering component or the digital document provider accesses the requested auxiliary layout information previously formulated for the content information of the digital document and based and control proceeds to 1820. At 1820, the accessed auxiliary layout information may be transmitted to the RRRC. Subsequently, control proceeds to 1825, at which a determination may be made whether the AMEI included in the digital document and the auxiliary layout information provided by the altering component require obtaining auxiliary content information not included in the digital document. If not, control proceeds to 1835. If so, control proceeds to 1830, at which the RRRC obtains that auxiliary content information (for example, by communicating with the digital document provider, communicating with one or more remote sources, and/or the user system).

Subsequently, control proceeds to 1835, at which point the AMEI instructs the RRRC to alter the digital document given the new information and transmit the digital document to the control software associated with the second rendering device and control proceeds to 1840. At 1840, the control software for the second rendering device determines how to parse and render the new version of the digital document according to the software associated with the second rendering device (print subroutine and printer driver) and a render-able file may be created. Control then proceeds to 1845, at which point the render-able file may be forwarded to the second rendering device for rendering. Subsequently, at 1850, the second rendering device receives the information and renders the digital document in the new medium, e.g., printed pages, using the appropriate pieces of layout, content, additional information, auxiliary layout information and potentially auxiliary content information previously designated by the AMEI and auxiliary layout information. Control then proceeds to 1855, at which operations associated with processing the event ends.

It should be understood that, if the process of at least the second embodiment of the invention altered the digital document from its original version on the first rendering device, control may proceed to implement operations associated with the tenth embodiment (explained herein) subsequent to 1835.

It should also be understood that immediately upon forwarding the newly rendered digital document to the control software 1835 associated with the second rendering device, the AMEI can be programmed to hide the layout information and auxiliary content information, if included and unhide, or display, all of the components of the original digital document (e.g., layout, content and additional instructions.) If the appearance of the digital document on the first rendering device was altered by the AMEI in order to forward the newly rendered digital document to the control software of the second rendering device and then changed back after forwarding the digital document, it may appear as if nothing has changed to the user because the change to the new version and the change back to the old version may be so rapid that the content and layout displayed on the screen appears to not have changed.

In accordance with at least a third embodiment of the invention, a method of creating and distributing a digital document (e.g., a web page) may be provided for viewing on a computer screen, that upon a certain user activation event (e.g., electing to print the digital document regardless of the method used to activate the print event, for example, activating or exciting a print button on the digital document, activating or exciting a print button on the browser or activating the print function of a pull-down menu of the browser), the digital document may be automatically altered to take advantage of the attributes of the print medium. Subsequently, once the newly rendered document may be forwarded for printing, the digital document reverts back to its original screen appearance. This process may be so rapid that it may be virtually unnoticeable by the user.

Figure 19:
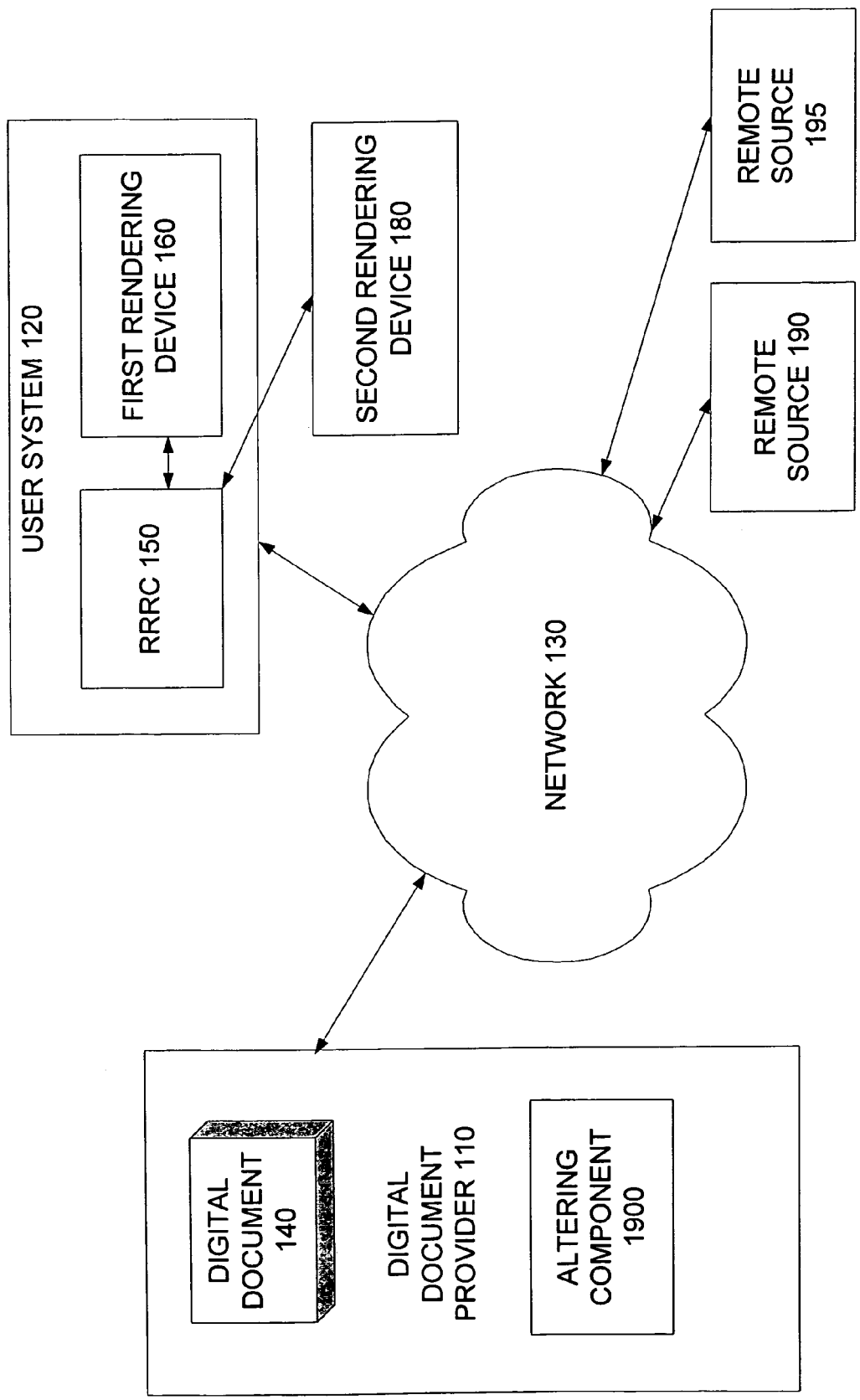
FIG. 19 shows a schematic representation of an environment in which at least a third embodiment may be implemented.

In accordance with at least a third embodiment of the invention, the digital document 140 may be sent the RRRC 150 in response to a request from the RRRC 150. As illustrated in FIG. 19, in accordance with at least this third embodiment, the altering component 1900 may be resident at the digital document provider 110, for example, behind a firewall and/or with protection from other security mechanisms provided by the digital document provider 110.

In accordance with at least this third embodiment, the altering component 1900 resident at the digital document provider 110 may not formulate auxiliary layout information for the digital document prior to that digital document being requested by the RRRC 150. Rather, auxiliary layout information may be created in response to a request received from the RRRC 150 associated with a request or activation event. Thus, as in at least the second embodiment of the invention, the third embodiment of the invention may not include auxiliary layout information in the digital document 140 transmitted to the RRRC 150 in response to its initial request.

Figure 20:
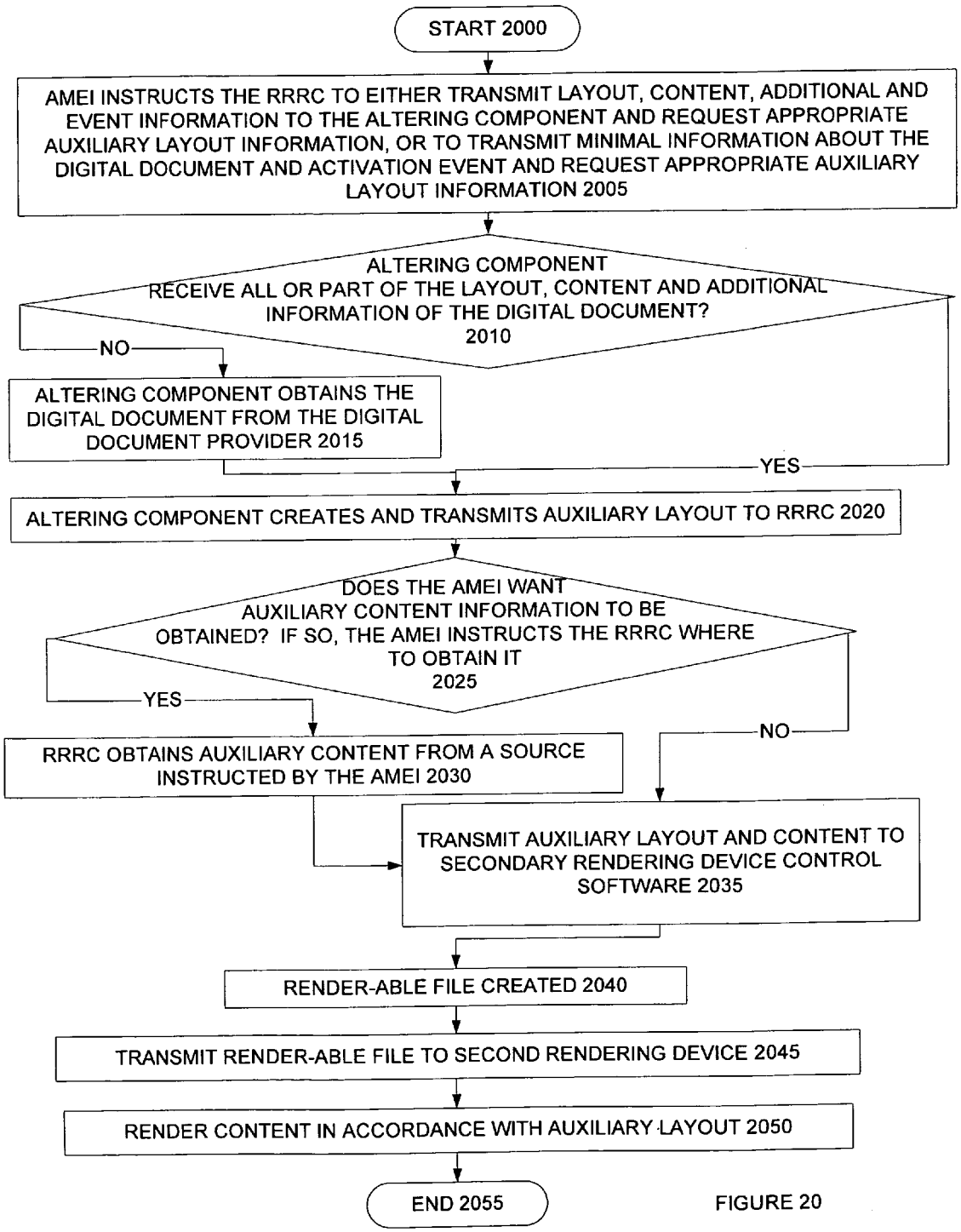
FIG. 20 illustrates operations associated with at least the third embodiment.

Therefore, as illustrated in FIG. 20, various operations occur following the user activating an event, e.g., a print event. The operations begin at 2000 and control proceeds to 2005, at which point, the AMEI instruct the RRRC to transmit a request (including information about the digital document, event activated and may include all or part of the layout, content and additional information of the digital document originally sent to the RRRC) to the altering component to formulate and provide appropriate auxiliary layout information for the activation event of the digital document. Control then proceeds to 2010, at which, if all or part of the layout, content and additional information was sent with the request, control moves to 2020 and the altering component formulates the appropriate auxiliary layout information and forwards the auxiliary layout information to the RRRC. Control can then proceed to 2025. If none of the layout, content and additional information was included in the request, control proceeds to 2015 and the altering component obtains such information from the digital content provider. Once received, control proceeds to 2020 and the altering component formulates the appropriate auxiliary layout information and forwards the auxiliary layout information to the RRRC and control proceeds to 2025. At 2025, a determination may be made by the AMEI whether auxiliary content information needs to be obtained by the RRRC. If no auxiliary content information is required, control proceeds to 2035. If auxiliary content information is required, the AMEI instructs the RRRC to obtain the appropriate information and control proceeds to 2030, at which the RRRC obtains that auxiliary content information (for example, by communicating with the digital document provider, communicating with one or more remote sources, and/or the user system).

Subsequently, control proceeds to 2035, at which point the AMEI instructs the RRRC to alter the digital document given the new information and transmit the digital document to the control software associated with the second rendering device and control proceeds to 2040. At 2040, the control software for the second rendering device determines how to parse and render the new version of the digital document according to the software associated with the second rendering device (e.g., a print subroutine and printer driver) and a render-able file may be created. Control then proceeds to 2045, at which point the render-able file may be forwarded to the second rendering device for rendering. Subsequently, at 2050, the second rendering device receives the information and renders the digital document in the new medium, e.g., printed pages, using the appropriate pieces of layout, content, additional information, auxiliary layout information and potentially auxiliary content information previously designated by the AMEI and auxiliary layout information. Control then proceeds to 2055, at which operations associated with processing the event ends.

It should be understood that, in accordance with at least the third embodiment of the invention, the embodiment may include a variation wherein the request for auxiliary layout information transmitted from the user system to the altering component may also include content information of the digital document sent to the RRRC. In such a variation, those operations requiring interaction between the altering component and the digital document provider to obtain the content information prior to formulating the auxiliary layout information are unnecessary because the altering component has obtained the content information directly from the user system.

It should also be understood that, if the process of at least this third embodiment altered the digital document 140 from its original version on the first rendering device, control may proceed after 2035 to operations performed in conjunction with the tenth embodiment (explained herein).

Moreover, it should be understood that, immediately upon forwarding the newly rendered digital document to the control software 2035 associated with the second rendering device, the AMEI can be programmed to hide the layout information and auxiliary content information, if included and unhide, or display, all of the components of the original digital document (layout, content and additional instructions.) If the appearance of the digital document on the first rendering device was altered by the AMEI in order to forward the newly rendered digital document to the control software of the second rendering device and then changed back after forwarding the digital document, it may appear as if nothing has changed to the user as the change to the new version and the change back to the old version may be so rapid that the content displayed on the computer screen appears to not have changed.

In accordance with at least a fourth embodiment, a method of creating and distributing a digital document (e.g., a web page) is provided for viewing on a computer screen, that upon a certain user activation event (e.g., electing to print the digital document regardless of the method used to activate the print event, for example, activating or exciting a print button on the digital document, activating or exciting a print button on the browser or activating the print function of a pull-down menu of the browser), the digital document may be automatically altered to take advantage of the attributes of the print medium and then once the newly rendered document may be forwarded for printing, the digital document reverts back to its original screen appearance. This process may be so rapid that it may be virtually unnoticeable by the user.

Figure 21:
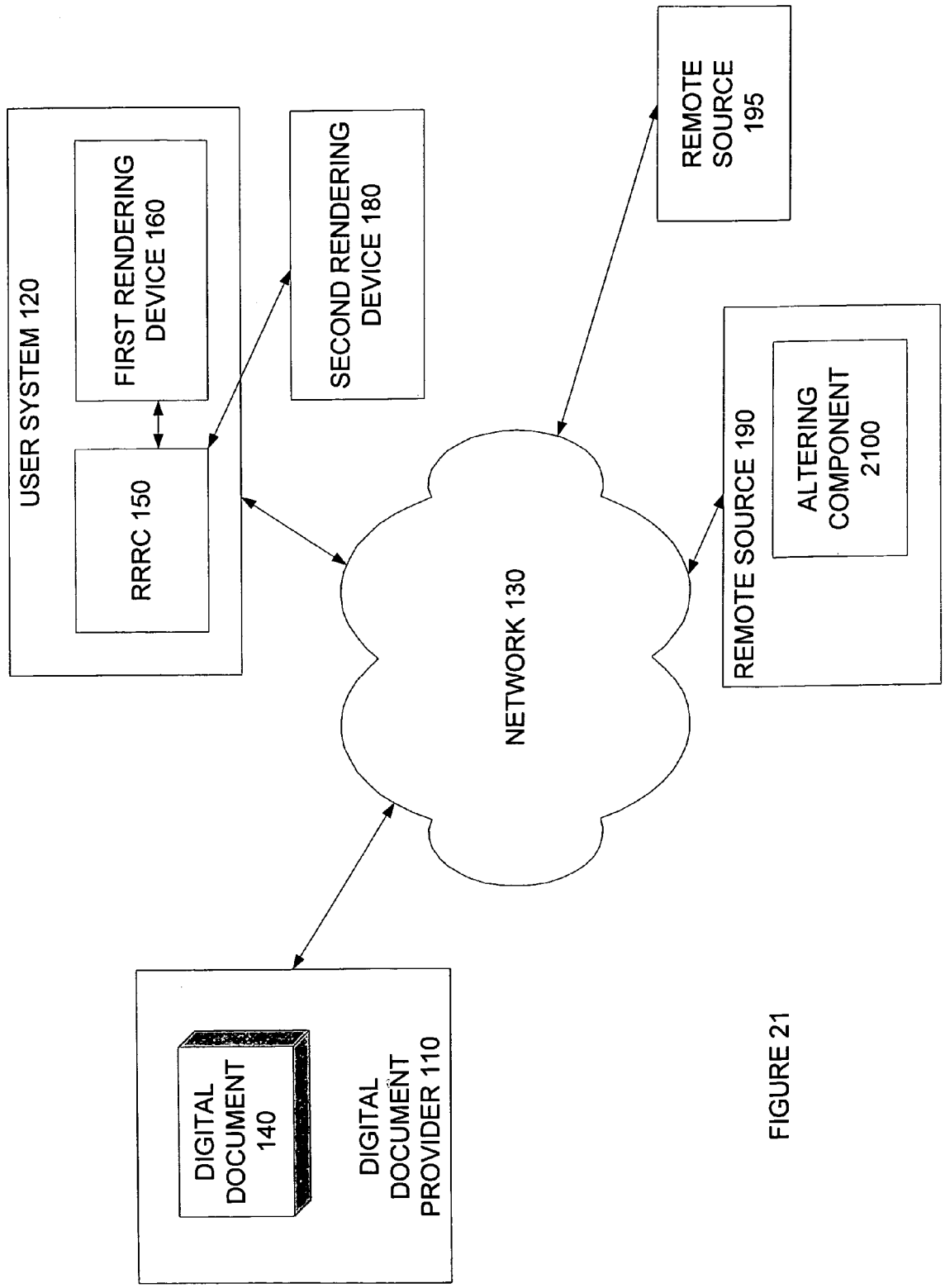
FIG. 21 shows a schematic representation of an environment in which at least a fourth embodiment may be implemented.

In accordance with at least this fourth embodiment of the invention, the digital document 140 may be originally sent to the RRRC 150 in response to a request from the RRRC 150. As illustrated in FIG. 21, in accordance with at least this fourth embodiment the altering component 2100 may be resident at a remote source 190 rather then the digital document provider 110; however, the altering component 2100 may be capable of communicating with the digital document provider 110, the user system 120, and, if necessary another remote source 195 providing, for example, auxiliary content information to be rendered along with the content information of the digital document 140 by the first and/or second rendering devices 160, 180.

The altering component creates one or more sets of auxiliary layout information in response to a request received from the RRRC 150 associated with a request or activation event. Thus, as in at least the second embodiment of the invention, the fourth embodiment of the invention may not include auxiliary layout information in the digital document 140 transmitted to the RRRC 150 in response to its initial request.

Figure 22:
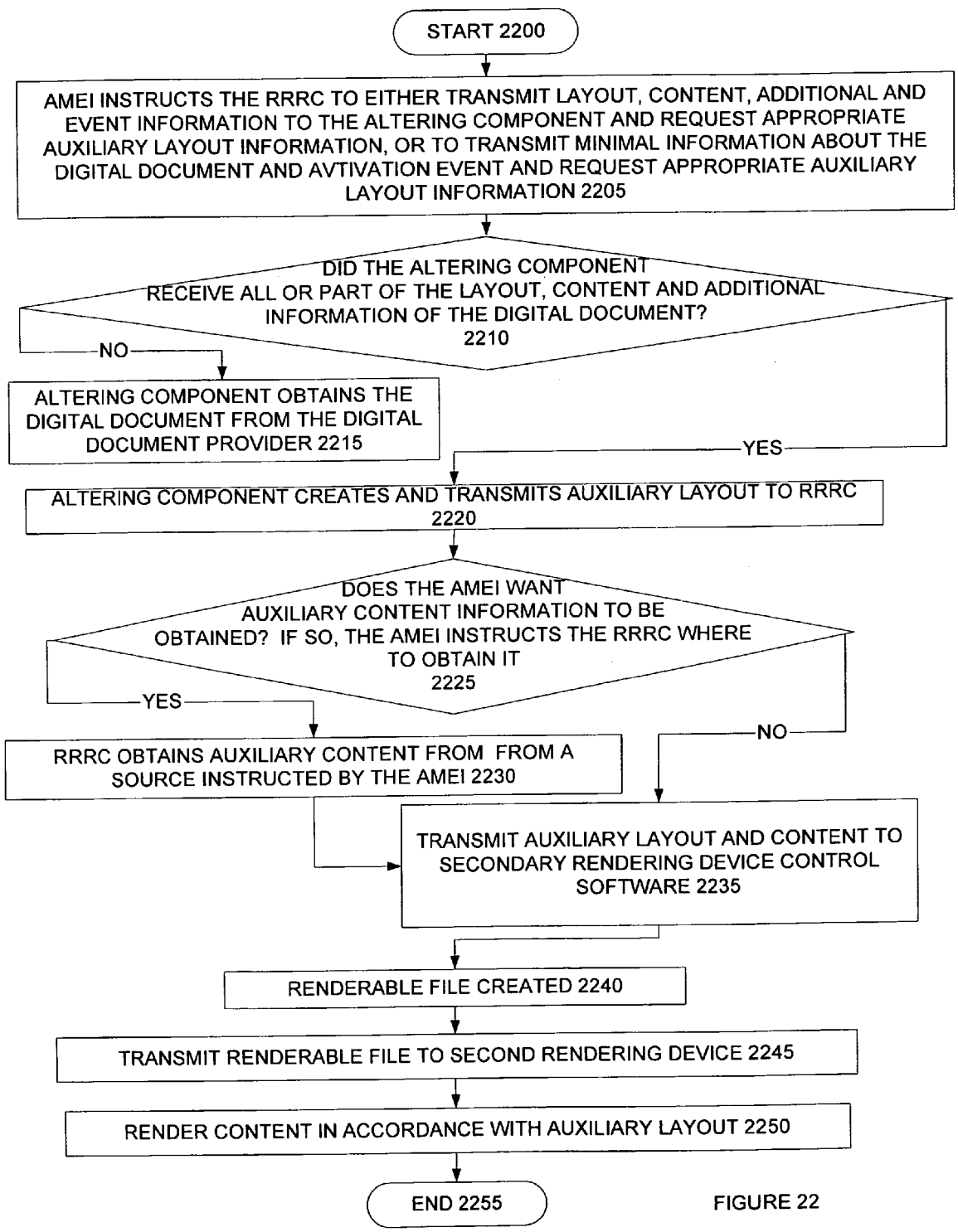
FIG. 22 illustrates operations associated with at least the fourth embodiment.

Therefore, as illustrated in FIG. 22, various operations occur following the user activating an event, e.g., a print event. The operations begin at 2200 and control proceeds to 2205, at which point, the AMEI instruct the RRRC to transmit a request (including information about the digital document, event activated and may include all or part of the layout, content and additional information of the digital document originally sent to the RRRC) to the altering component to formulate and provide appropriate auxiliary layout information for the activation event of the digital document. Control then proceeds to 2210, at which, if all or part of the layout, content and additional information was sent with the request, control moves to 2220 and the altering component formulates the appropriate auxiliary layout information and forwards the auxiliary layout information to the RRRC. Control can then proceed to 2225. If none of the layout, content and additional information was included in the request, control moves to 2215 and the altering component obtains such information from the digital content provider. Once received, control proceeds to 2220 and the altering component formulates the appropriate auxiliary layout information and forwards the auxiliary layout information to the RRRC and control proceeds to 2225. At 2225, a determination may be made by the AMEI whether auxiliary content information needs to be obtained by the RRRC. If no auxiliary content information is required, control proceeds to 2235. If auxiliary content information is required, the AMEI instructs the RRRC to obtain the appropriate information and control proceeds to 2230, at which the RRRC obtains that auxiliary content information (for example, from the altering component, the digital document provider, one or more remote sources, and/or the user system).

Subsequently, control proceeds to 2235, at which point the AMEI instructs the RRRC to alter the digital document given the new information and transmit the digital document to the control software associated with the second rendering device and control proceeds to 2240. At 2240, the control software for the second rendering device determines how to parse and render the new version of the digital document according to the software associated with the second rendering device (e.g., a print subroutine and printer driver) and a render-able file may be created. Control then proceeds to 2245, at which point the render-able file may be forwarded to the second rendering device for rendering. Subsequently, at 2250, the second rendering device receives the information and renders the digital document in the new medium, e.g., print, using the appropriate pieces of layout, content, additional information, auxiliary layout information and potentially auxiliary content information previously designated by the AMEI and auxiliary layout information. Control then proceeds to 2255, at which operations associated with processing the event ends.

If the process of this embodiment altered the digital document 140 from its original version on the first rendering device, after 2235, control may proceed to operations performed in conjunction with the tenth embodiment (explained herein).

It should be understood that, in accordance with at least this fourth embodiment of the invention, the embodiment may include a variation wherein the request for auxiliary layout information transmitted from the user system to the altering component may also include content information of the digital document sent to the RRRC. In such a variation, those operations requiring interaction between the altering component and the digital document provider to obtain the content information prior to formulating the auxiliary layout information are unnecessary because the altering component has obtained the content information directly from the user system.

Additionally, in accordance with at least this fourth embodiment of the invention, if it is determined that auxiliary content information may be included in the auxiliary layout information provided to the RRRC, that auxiliary content information may be provided by the digital document provider, a remote source either to the altering component (which may subsequently provide it to the user system) or to the user system directly at the request of the altering component (such a request being potentially provided subsequent to the formulating of the auxiliary layout information but prior to the auxiliary layout information being transmitted to the RRRC).

Moreover, in accordance with this fourth embodiment of the invention, immediately upon forwarding the newly rendered digital document to the control software associated with the second rendering device at 2235, the AMEI can be programmed to hide the layout information and auxiliary content information, if included and unhide, or display, all of the components of the original digital document (e.g., layout, content and additional instructions.) If the appearance of the digital document on the first rendering device was altered by the AMEI in order to forward the newly rendered digital document to the control software of the second rendering device and then changed back after forwarding the digital document, it may appear as if nothing has changed to the user as the change to the new version and the change back to the old version may be so rapid that the screen appears to not have changed.

Figure 23:
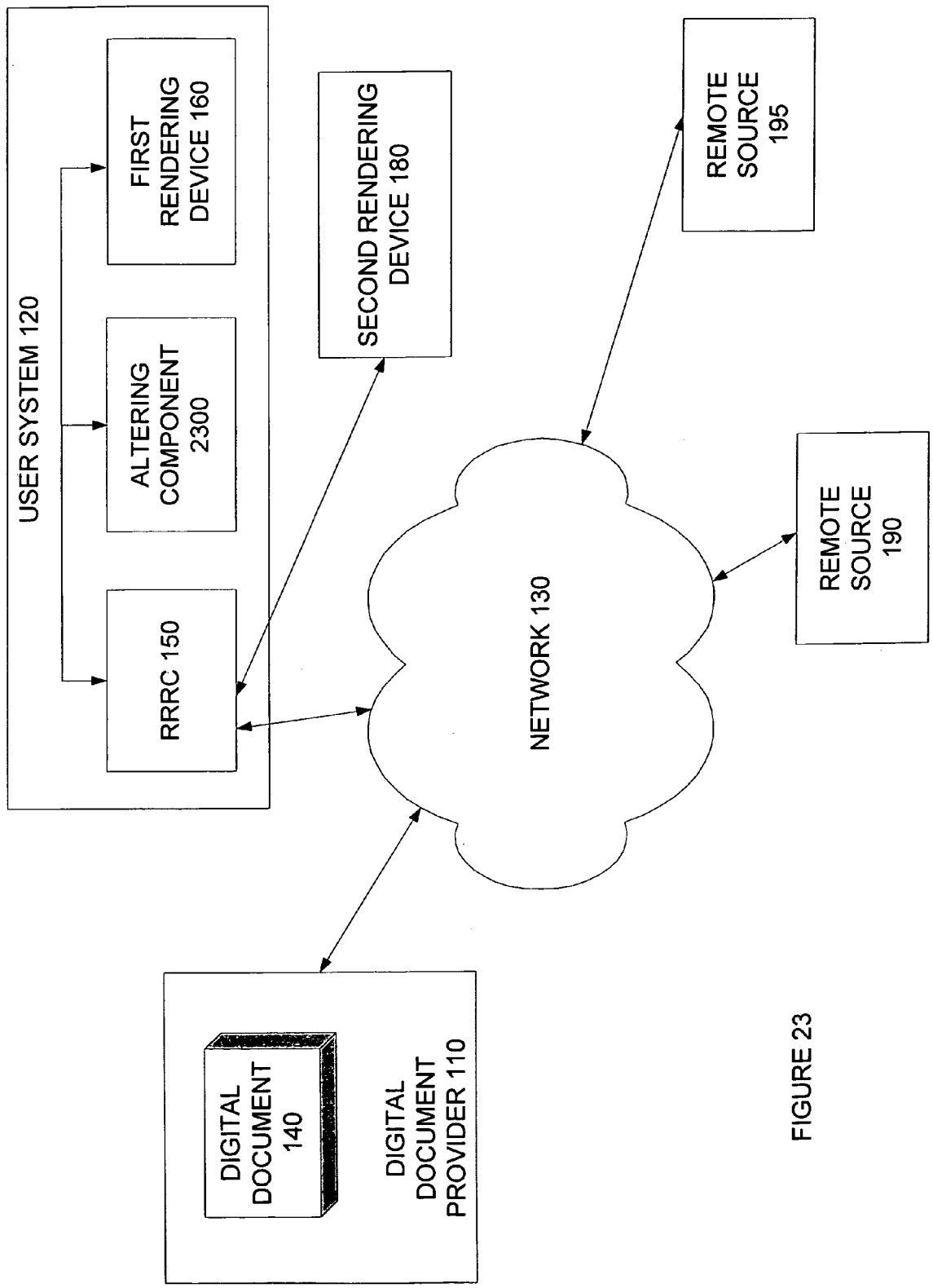
FIG. 23 shows a schematic representation of an environment in which at least a fifth embodiment may be implemented.

In accordance with at least a fifth embodiment of the invention, a digital document 140 may be initially sent to the RRRC 150 in response to a request from the RRRC 150. However, as illustrated in FIG. 23, an altering component may be configured in such a way that it can be installed on a user system and utilized by the user to alter digital documents upon specific events defined in the AMEI of a digital document or defined by the user utilizing the altering component. In accordance with at least this fifth embodiment, the altering component 2300 may be resident at the user system 120 rather then at the digital document provider or a remote source; however, the altering component 2300 may be capable of communicating with the content provider 110, via the RRRC 150, and, if necessary one or more remote sources 190, 195 providing, for example, auxiliary content information to be rendered along with the layout, content and additional information of the digital document 140 by the first and/or second rendering devices 160, 180.

In accordance with at least this fifth embodiment of the invention, the altering component can use the instructions in the AMEI of the digital document or ignore those instructions in response to a request or activation event, e.g., a print event. A user may also choose to utilize the existing instructions of the AMEI for obtaining or formulating auxiliary layout and/or auxiliary content information to be used by the RRRC 150, in cooperation with control software (e.g., print subroutines and printer driver) associated with the second rendering device 180 in the user system 120.

In accordance with at least this embodiment, the altering component may not formulate auxiliary layouts for the digital document prior to that digital document being requested by the RRRC 150. Rather, auxiliary layouts may be formulated in response to a request received from the RRRC 150 associated with a request or activation event. Thus, in at least this fifth embodiment of the invention, auxiliary layout information may not be included in the digital document transmitted to the RRRC 150 in response to its initial request.

Figure 24:
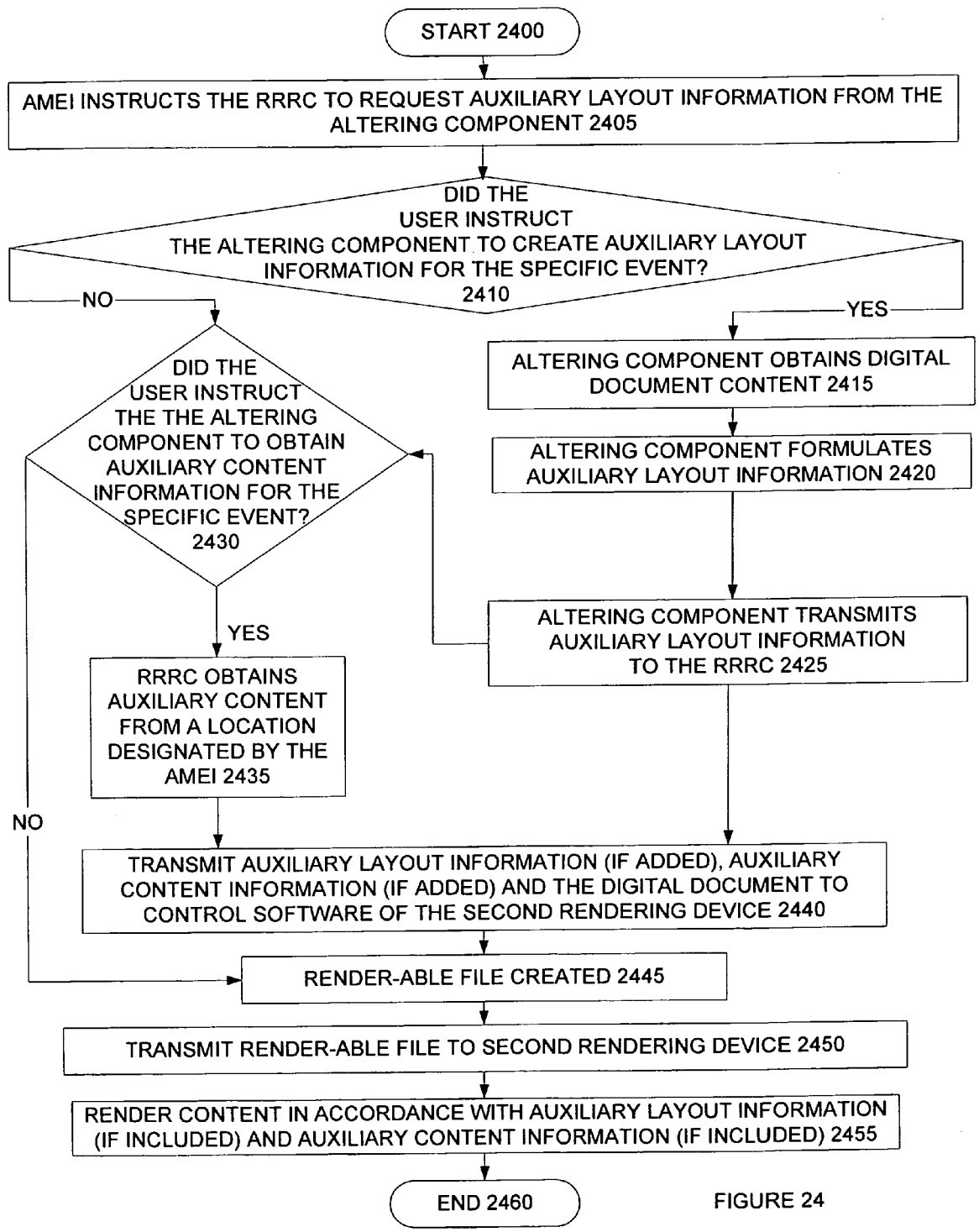
FIG. 24 illustrates operations associated with at least the fifth embodiment.

Therefore, as illustrated in FIG. 24, various operations occur following the user activating an event, e.g., a print event. The operations begin at 2400 and control proceeds to 2405, at which, the AMEI included in the digital document instruct the RRRC to transmit a request to the altering component (resident at the user system) to formulate and provide an auxiliary layout for the content of the digital document. Control then proceeds to 2410, at which the altering component determines if the user requested that auxiliary layout information be created for the specific event. If the user elected to have the auxiliary layout information created and rendered, control proceeds to 2415 and the altering component obtains the digital document prior to rendering the auxiliary layout information. Control then proceeds to 2420 and the altering layout creates the auxiliary layout information. Control then proceeds to 2425 and the altering component forwards the auxiliary layout information back to the RRRC and obtains the content of the digital document from the RRRC. Control then proceeds to 2430. If the user had instructed the altering component not to create auxiliary layout information, control would have skipped steps 2415, 2420 and 2425 and moved directly to 2430. Once at 2430 the altering component determines if the user requested that auxiliary content information be obtained for the specific event. If the user made such a request, the AMEI instructs the RRRC where to obtain such information and control moves to 2435 where the RRRC obtains the appropriate auxiliary content information and forwards it to secondary rendering device control software. Control then proceeds to 2440. If the user did not make such a request, control skips step 2430 and moves directly to step 2440. At 2440, the RRRC forwards the digital document and, if added the auxiliary layout information and, if added, the auxiliary content information to the control software (e.g., a print subroutine and printer driver) associated with the second rendering device. Control then proceeds to 2445 where the control software associated with the second rendering device pareses the information and creates a render-able file and forwards it to the second rendering device in step 2450. Subsequently, at 2250, the second rendering device receives the information and renders the digital document in the new medium, e.g., print, using the appropriate pieces of layout, content, additional information, auxiliary layout information (if added) and the auxiliary content information (if added). Control then proceeds to 2460, at which operations associated with processing the event ends.

In accordance with at least this fifth embodiment, immediately upon forwarding the newly rendered digital document to the control software associated with the second rendering device 2440, the AMEI can be programmed by the user to hide the layout information (if included) and auxiliary content information (if included), and unhide, or display all of the components of the original digital document (layout, content and additional instructions.) If the appearance of the digital document on the first rendering device was altered by the AMEI in order to forward the newly rendered digital document to the control software of the second rendering device and then, by the choice of the user, change back after forwarding the digital document, it may appear as if nothing has changed to the user as the change to the new version and the change back to the old version may be so rapid that the screen appears to not have changed.

In accordance with a sixth embodiment, a method is provided which relates to the first through fifth embodiments but it performed subsequent to performance of any activation event. Specifically, subsequent to such performance, the AMEI can instruct automatic creation of a third version of the digital document 140 for display on the first rendering device 160 (the second version being specific to the second rendering device 180).

Figure 25:
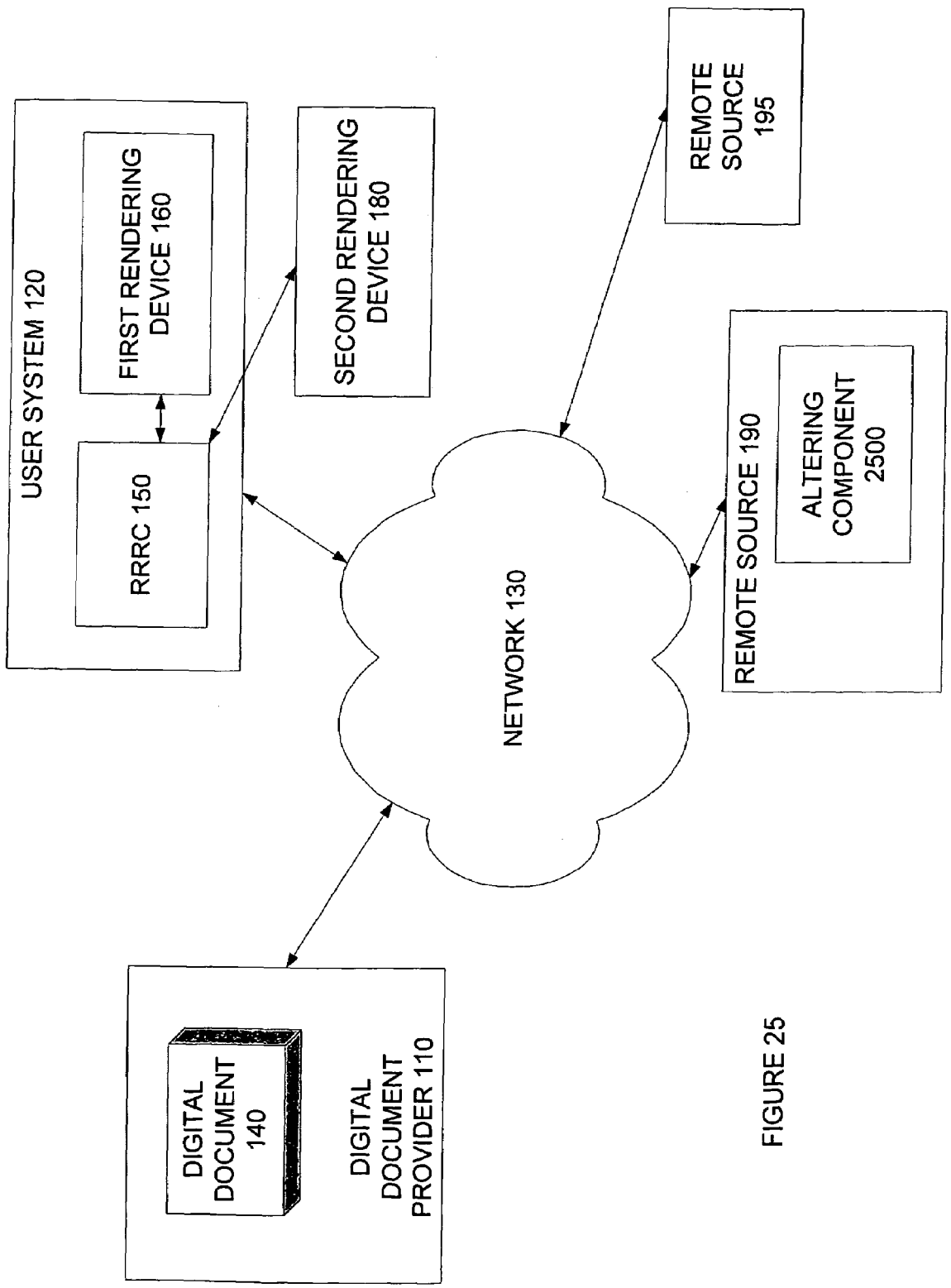
FIG. 25 shows a schematic representation of an environment in which at least a sixth embodiment may be implemented.

As illustrated in FIG. 25, in accordance with all activation embodiments the altering component 2500 may be resident at the digital document provider 110, for example, behind a firewall and/or with protection from other security mechanisms provided by the digital document provider 110, at the user system 120, or, as in this illustration at a remote source 190; however, the altering component 2500 may be capable of communicating with the digital document provider 110, the user system 120, and, if necessary another remote source 195 providing, for example, auxiliary content information to be rendered along with the content information of the digital document 140 by the first and/or second rendering devices 160, 180.

The altering component creates auxiliary layout information in response to a request received from the RRRC 150 associated with the completion of a request or activation event. Thus, as in at least the second embodiment of the invention, the sixth embodiment of the invention may not include auxiliary layout information being inserted into the digital document 140 transmitted to the RRRC 150 upon its initial request.

Figure 26:
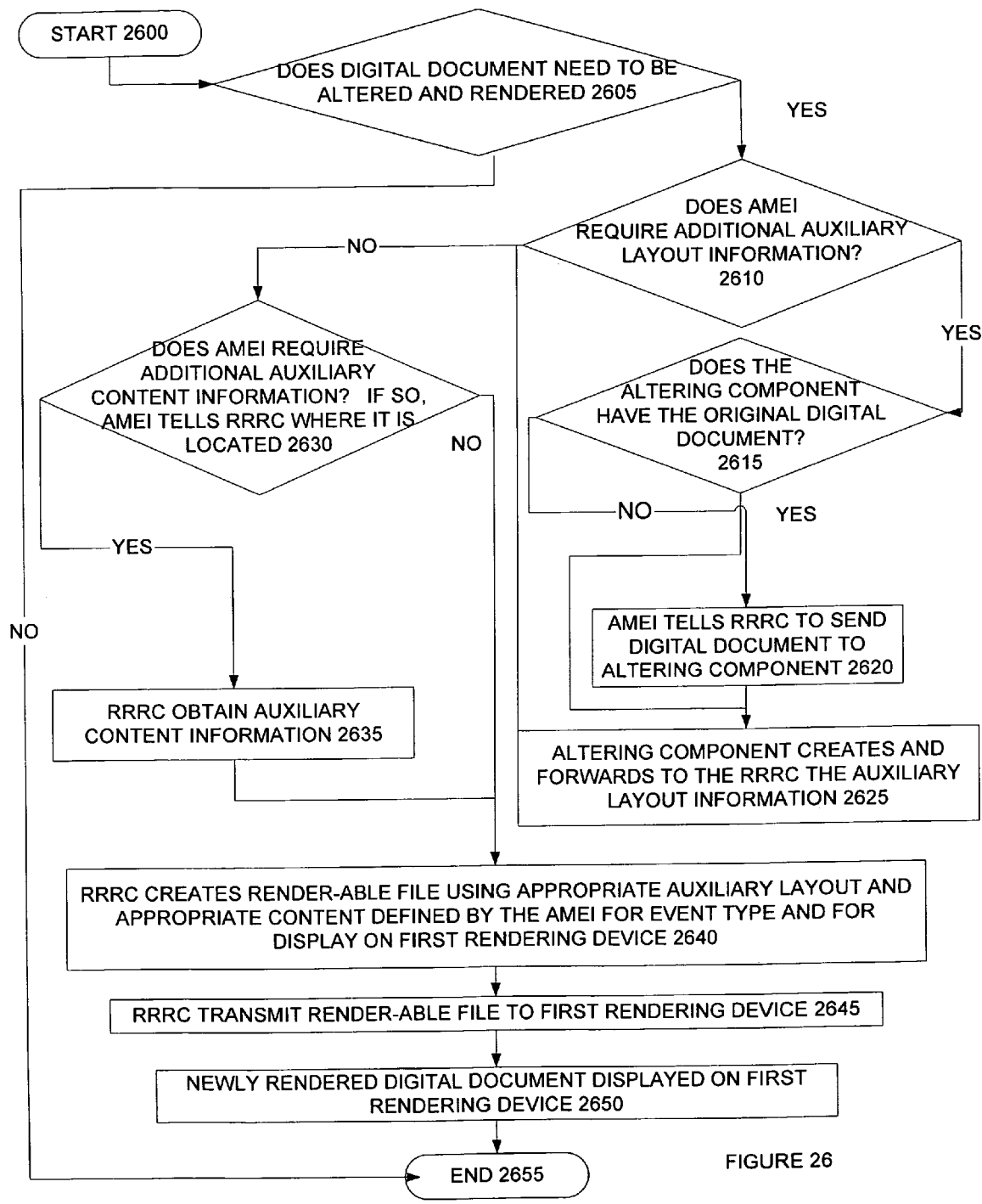
FIG. 26 illustrates operations associated with at least the sixth embodiment.

Therefore, as illustrated in FIG. 26, various operations occur subsequent to the completion of an activation event, e.g., a print event. The operations begin at 2600 and control proceeds to 2605, at which point, the AMEI determines, based on instructions coded within it, whether the digital document needs to be altered and rendered in a new way on the first viewing medium. If the AMEI determines that the digital document should remain the same, control proceeds to 2655 and the process ends. If the AMEI determines that the digital document should be altered and rendered in a new way on the first viewing medium, control proceeds to 2610. At this point, the AMEI determines if the digital document requires additional auxiliary layout information. If so, control moves to 2630. If not, control proceeds to 2615 and the AMEI determines if the altering component has the original digital document from which to proceed. If the AMEI has the original digital document, control proceeds to 2625. If the AMEI determines a copy of the digital document should be sent, control proceeds to 2620 and the AMEI instructs the RRRC to send the digital document to the altering component. The altering component then creates the auxiliary layout information and sends a copy back to the RRRC.

Control then proceeds to 2630 at which the AMEI determines if auxiliary content information is required. If not, control proceeds to 2640. If so, then the AMEI instructs the RRRC where the auxiliary content information is located and instructs the RRRC to obtain it. In 2635, the RRRC obtains the auxiliary content information and control moves to 2640. The RRRC uses the layout, content and additional information of the digital document and applies the auxiliary layout information (if added) and the auxiliary content information (if added), alters the digital document and creates a renderable file as defined by the AMEI for the event which was recently executed. Control then proceeds to 2645, at which the RRRC transfers the render-able file to the first rendering device. Control proceeds to 2650, at which the newly rendered digital document is displayed on the first rendering device. Control then proceeds to 2655 and the process ends.

Figure 27:
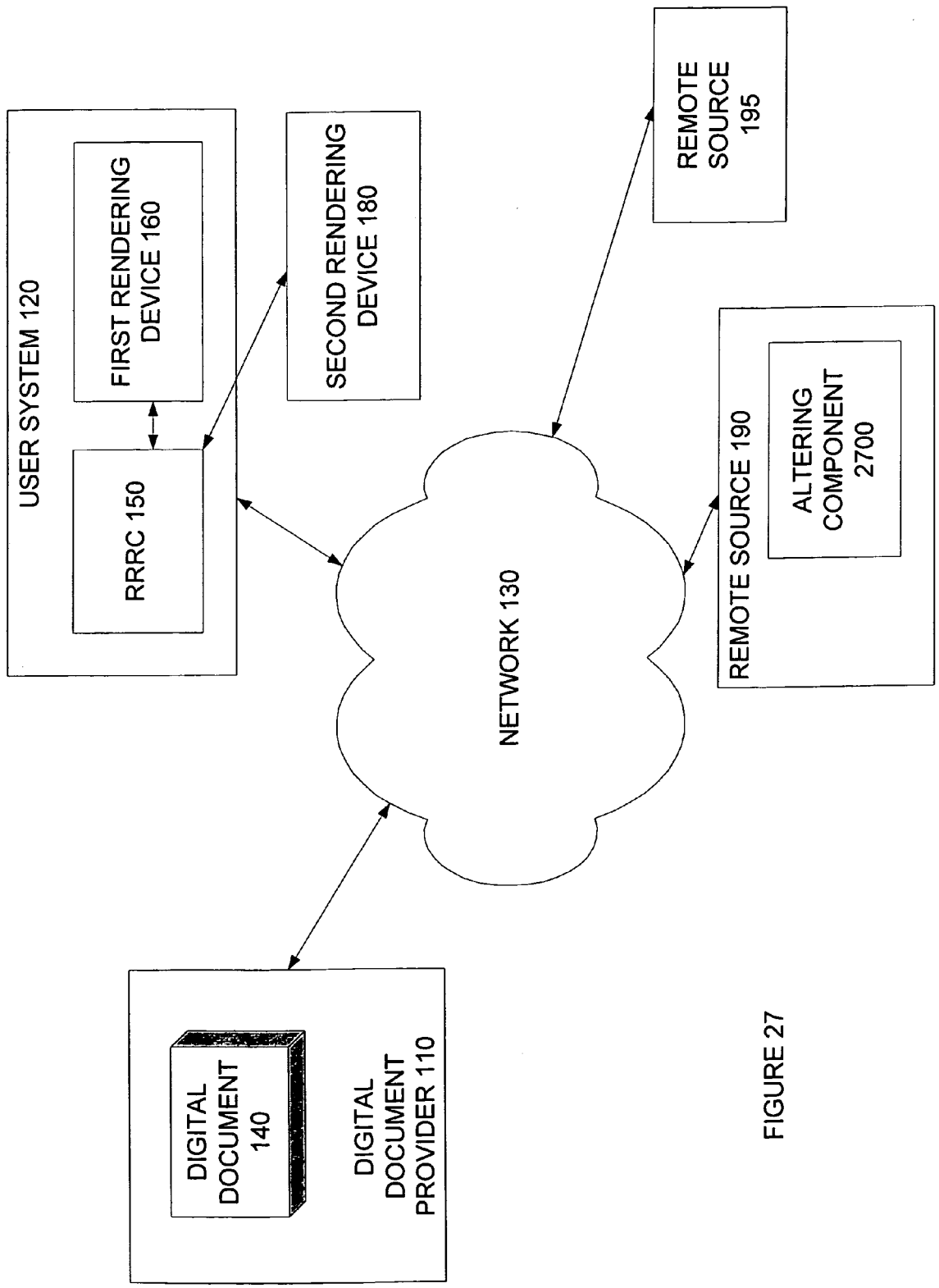
FIG. 27 shows a schematic representation of an environment in which at least a seventh embodiment may be implemented.

In accordance with at least a seventh embodiment of the invention, a method is provided that relates to the initiation of an activation event (e.g., a user activating or exciting a button or icon in the digital document) and, as a result, a digital document being altered and rendered on the first viewing device (e.g., a computer screen). As illustrated in FIG. 27, in accordance with at least the seventh embodiment, the altering component 2700 may be resident at the digital document provider 110, for example, behind a firewall and/or with protection from other security mechanisms provided by the digital document provider 110, at the user system 120, or, as in this illustration at a remote source 190; however, the altering component 2700 may be capable of communicating with the digital document provider 110, the user system 120, and, if necessary another remote source 195 providing, for example, auxiliary content information to be rendered along with the content information of the digital document 140 by the first and/or second rendering devices 160, 180.

In accordance with at least this seventh embodiment, the altering component creates auxiliary layout information in response to a request received from the RRRC 150 associated with an activation event. Thus, as in at least the second embodiment of the invention, the seventh embodiment of the invention may not include auxiliary layout information being inserted into the digital document 140 transmitted to the RRRC 150 upon its initial request.

Figure 28:
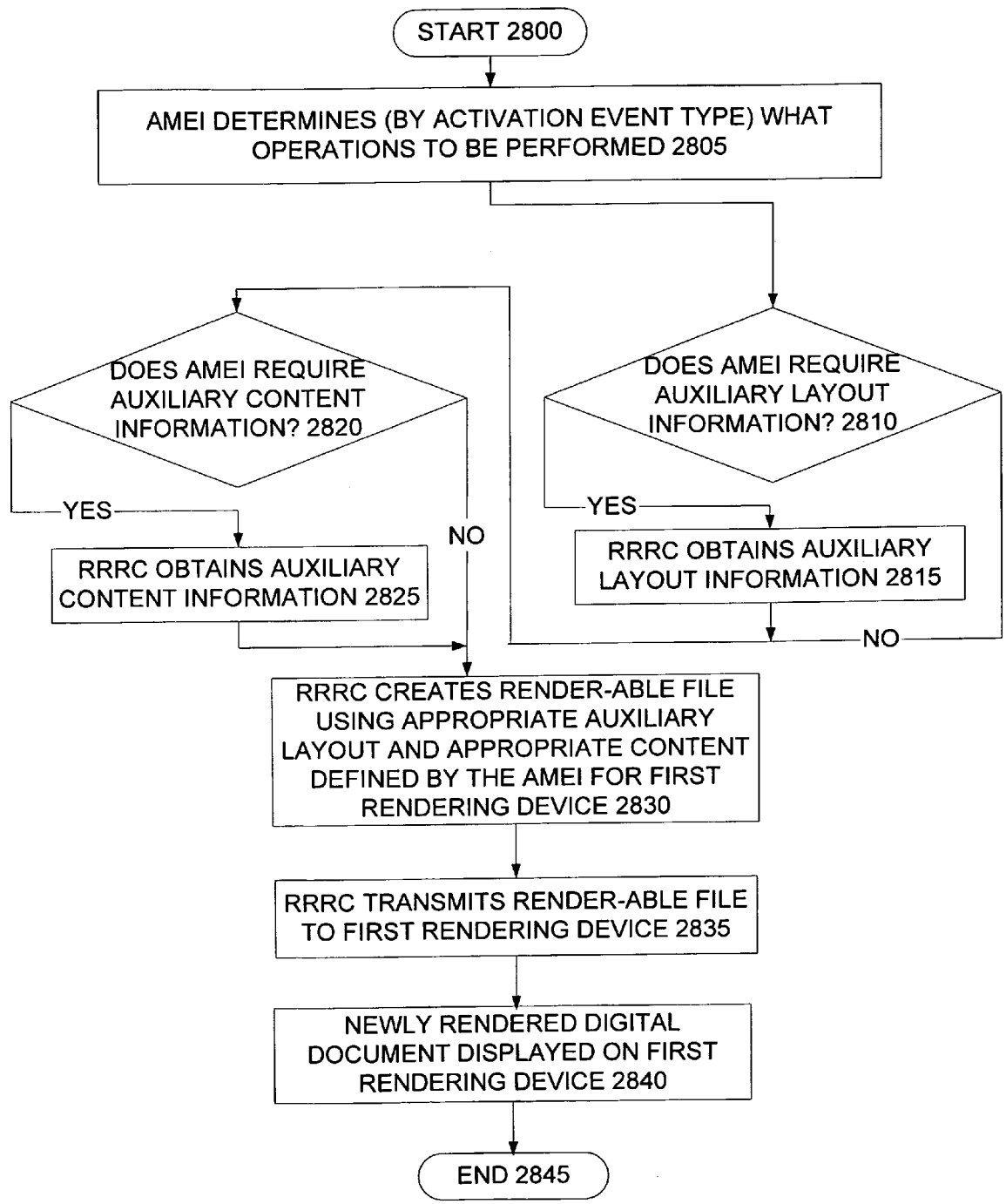
FIG. 28 illustrates operations associated with at least the seventh embodiment.

Therefore, as illustrated in FIG. 28, various operations occur upon the activation event, e.g., the user activating or exciting a button or icon in the digital document. The operations begin at 2800 and control proceeds to 2805, at which point, the AMEI determines through instructions encoded in the AMEI and based on the type of event which was activated what the next step should be. Control then proceeds to 2810, at which the AMEI determines if and which auxiliary information is required. If no auxiliary information is required, control moves to 2820. If the AMEI determines auxiliary layout information is required, control proceeds to 2815, at which point the AMEI instructs the RRRC what auxiliary layout information is needed and where it can be obtained and the RRRC obtains the needed auxiliary layout information. Control then proceeds to 2820 at which point the AMEI determines if auxiliary content information is required. If not, control proceeds to 2830. If auxiliary content is required, control proceeds to 2825, at which the AMEI instructs the RRRC to get the auxiliary content information and from where it can be obtained and the RRRC obtains the appropriate auxiliary content information and control proceeds to 2830. At 2830, the RRRC alters the digital document and applies the appropriate auxiliary layout information (if included) and the appropriate auxiliary content information (if included) and creates a render-able file according to the instructions defined by the AMEI for the first rendering device. At 2835, the RRRC forwards the render-able file to the first rendering device, and, at 2840, the newly rendered digital document may be displayed on the first rendering device. Control then proceeds to 2845 at which the process ends.

Figure 29:
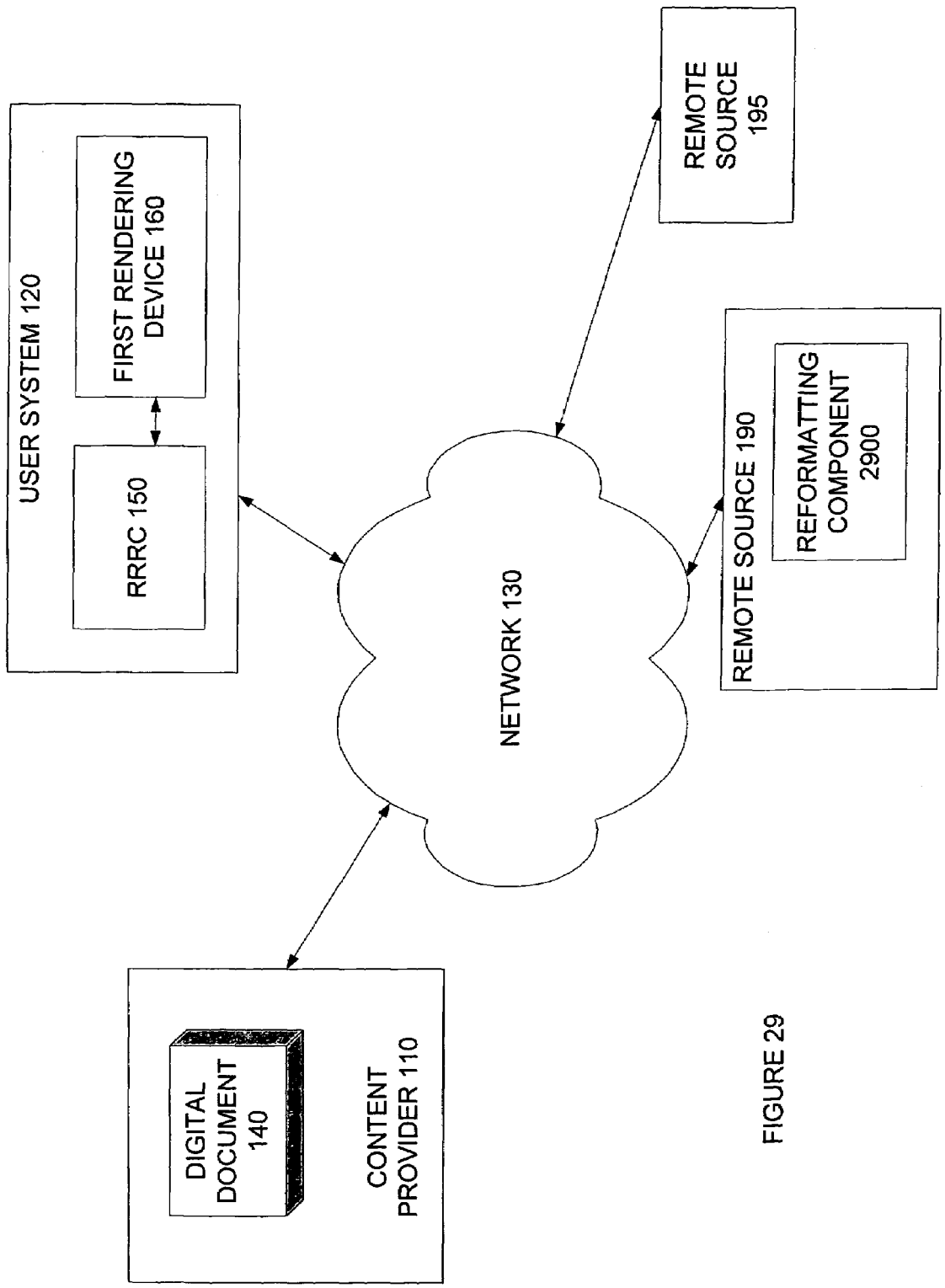
FIG. 29 shows a schematic representation of an environment in which at least an eighth embodiment may be implemented.

In accordance with at least an eighth embodiment of the invention, auxiliary layout information may be formulated in response to a request received from the RRRC 150 associated with a request or activation event. Thus, as illustrated in FIG. 29, in accordance with at least this eighth embodiment, the altering component 2900 may be resident at a remote source 190 rather then the digital document provider 110; however, the altering component 2300 may be capable of communicating with the digital document provider 110, the user system 120, and, if necessary another remote source 195 providing, for example, auxiliary content information to be rendered along with the content information of the digital document 140 by the first and/or second rendering devices 160, 180.

This eighth embodiment has particular utility in processing request events, for example, when the RRRC 150 may be resident in a user system requiring a specialized format for rendering on the first rendering medium 160 of the user system. Such a scenario may occur, for example, when a user is attempting access a digital document using a mobile phone PDA, etc. In such a scenario, the viewing screen of the first rendering device 160, e.g., a mobile phone or PDA, can severely limit the layout and content that can be rendered.

Thus, in accordance with at least this embodiment of the invention, the altering component 2900 operates to provide auxiliary layout information in response to an RRRC 150 initially requesting the digital document 140 from the digital document provider 110. Accordingly, the request event transmitted from the RRRC 150 may be transmitted to the digital document provider 110 and includes identification of at least one characteristic of the first rendering device 160 or the digital document provider 110 can determine the ID characteristics based on the request, which allows the altering component 2900 to provide auxiliary layout information that may be based on the rendering capabilities of the first rendering device 160. Subsequently, that request event may be forwarded to the altering component 2900 along with the digital document forwarded by the digital document provider 110.

Figure 30:
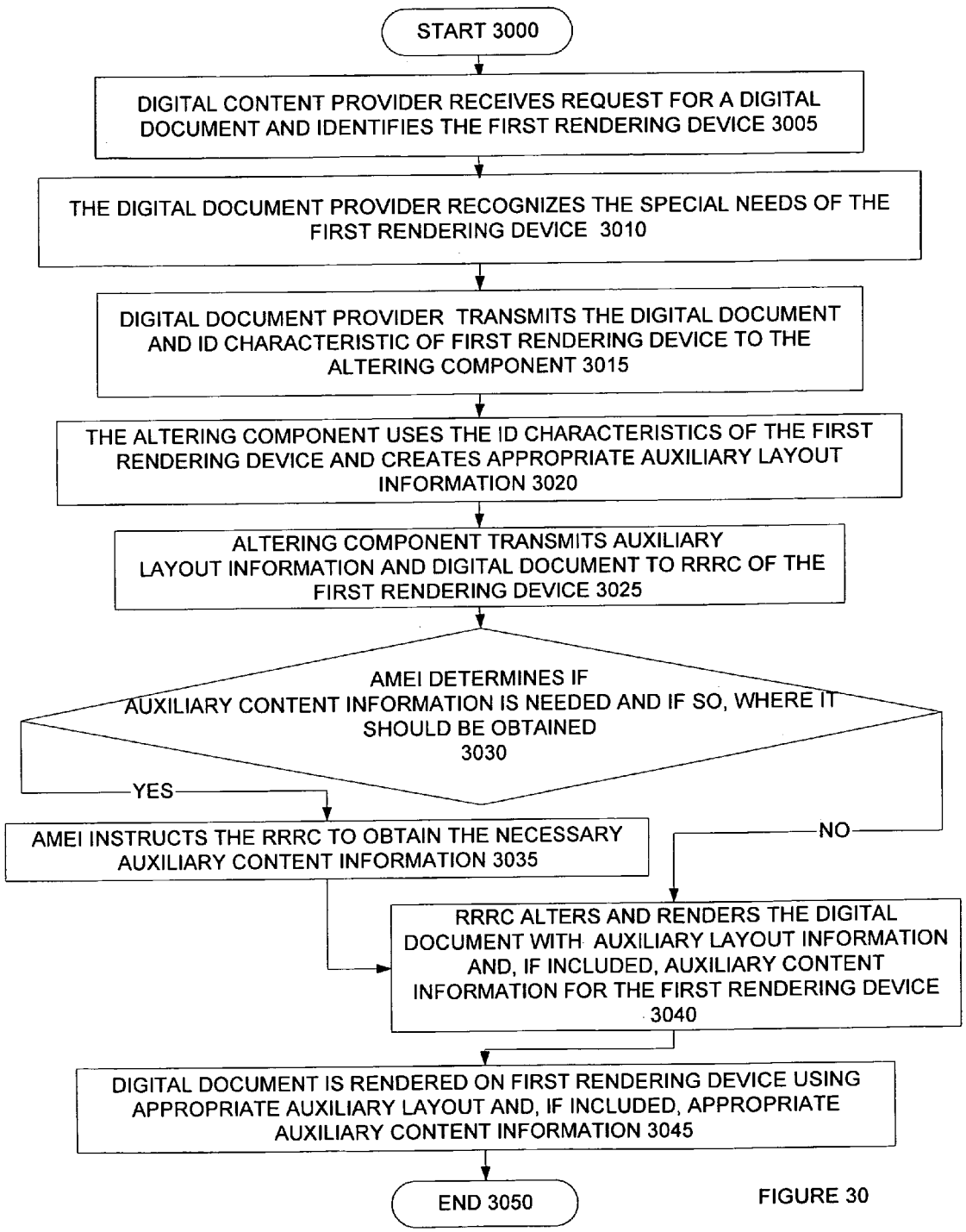
FIG. 30 illustrates operations associated with at least the eighth embodiment.

Therefore, as illustrated in FIG. 30, various operations occur following the user activating a request event. The operations begin at 3000 and control proceeds to 3005, at which, an RRRC transmits a request (including identification of at least one characteristic associated with the first rendering device or the digital document provider has the capability to obtain ID characteristics of the first rendering device based solely on the request) to the digital document provider to provide content information of a digital document in an auxiliary layout information, in this embodiment, a layout information associated with the first rendering device. Control then proceeds to 3010, at which the digital document provider identifies the special needs associated with the first rendering device. Control then proceeds to 3015, at which the digital document provider transmits the digital document and ID characteristics to the altering component, located at the remote source. At 3020, the altering component formulates auxiliary layout information for the digital document based on the ID characteristics of the first rendering device and control proceeds to 3025. At 3025, the formulated auxiliary layout information and the digital document are transmitted to the RRRC. Subsequently, control proceeds to 3030, at which a determination may be made whether the AMEI included in the digital document and the auxiliary layout information provided by the altering component require obtaining auxiliary content information not included in the digital document. If not, control proceeds to 3040. If so, control proceeds to 3035, at which the AMEI instructs the RRRC to obtain that appropriate auxiliary content information (for example, by communicating with the digital document provider who originally provided the digital document, communicating with a remote source, e.g., one or more servers, or communicating with the altering component).

Subsequently, control proceeds to 3040, at which RRRC alters the digital document with the auxiliary layout information and, if included, the auxiliary content information for rendering on the first rendering device, e.g., the screen of the mobile phone, PDA, etc., according to AMEI and the auxiliary layout information. Control then proceeds to 3045, at which the digital document may be rendered on the first rendering device using the appropriate auxiliary layout information and, if included, the appropriate auxiliary content information. Control then proceeds to 3050 at which operations associated with processing the event ends.

It should be understood that, in accordance with at least this eighth embodiment of the invention, a variation may be implemented in which the user system only interacts with the digital document provider rather then the altering component (being located at a remote source) acting as a proxy of sorts for providing the auxiliary layout information to the RRRC. In such a scenario the formulated auxiliary layout information and digital document (and auxiliary content information, if appropriate), would be transmitted from the altering component at the remote source to the digital document provider, who would then provide it to the requesting user system.

Moreover, it should be understood that another variation of at least this embodiment may provide the altering component resident at the digital document provider rather then at a remote source.

Figure 31:
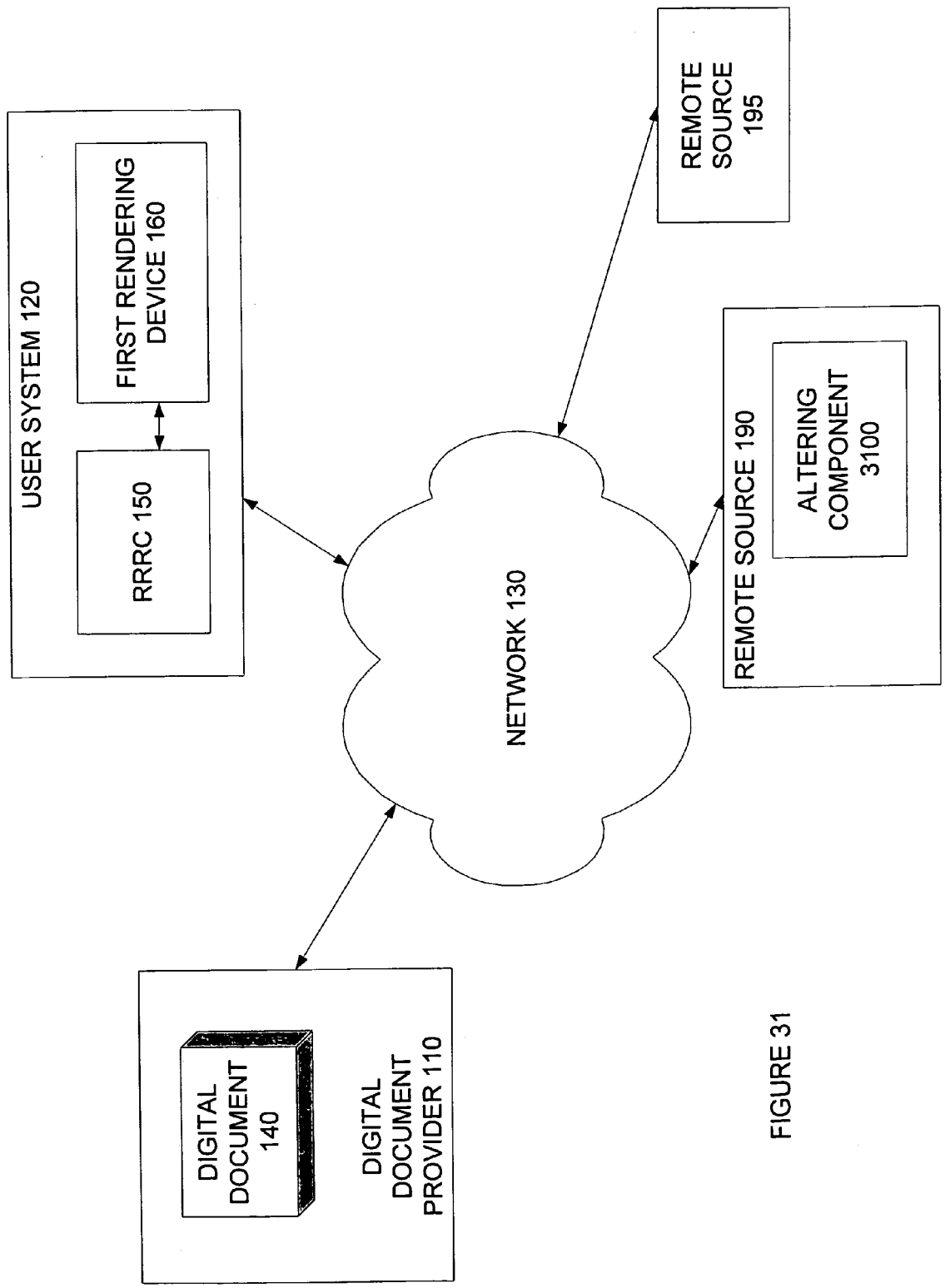
FIG. 31 shows a schematic representation of an environment in which at least a ninth embodiment may be implemented.

In accordance with at least a ninth embodiment of the invention, an auxiliary layout information may be formulated in response to a request received from the RRRC 150 associated with the initiation of a imbedded activation icon occurring subsequent to a first rendering of the digital document by the first rendering device. As illustrated in FIG. 31, in accordance with at least this embodiment the altering component 3100 may be resident at a remote source 190 rather then the digital document provider 110; however, the altering component 3100 may be capable of communicating with the digital document provider 110, the user system 120, and, if necessary another remote source 195 providing, for example, auxiliary content information to be rendered along with the digital document 140 by the first and/or second rendering devices 160, 180.

Similar to the eighth embodiment, this embodiment has particular utility in processing request events, for example, when the RRRC 150 may be resident in a user system requiring a specialized format for rendering on the first rendering medium 160 of the user system. Such a scenario may occur, for example, when a user is attempting access a digital document using a mobile phone, PDA, etc. However, in accordance with at least the ninth embodiment of the invention, the user system 120 has not provided information indicating at least one characteristic of the first rendering device (for example, information indicating whether the user system may be a mobile phone or PDA having a first rendering device, e.g., screen, with diminished dimensions). As a result, of this omission, the digital document 140 may be received by the user system 120 from the digital document provider 110 with layout, content and additional information consistent with rendering the digital document on a personal computer screen. For reasons that should be clear from the previous discussion, rendering the un-altered digital document on a mobile phone or PDA has certain deficiencies.

Thus, in accordance with at least this ninth embodiment of the invention, the digital document provider 110 includes an activation icon in its layout, which when implemented, triggers a transmission of a request to the digital document provider 110 to provide the content information using auxiliary layout information. Accordingly, the request event transmitted from the RRRC 150 may be transmitted to the digital document provider 110 and then includes identification of at least one characteristic of the first rendering device 160, which allows the altering component 3100 to provide auxiliary layout information that may be based on the rendering capabilities of the first rendering device 160.

Figure 32:
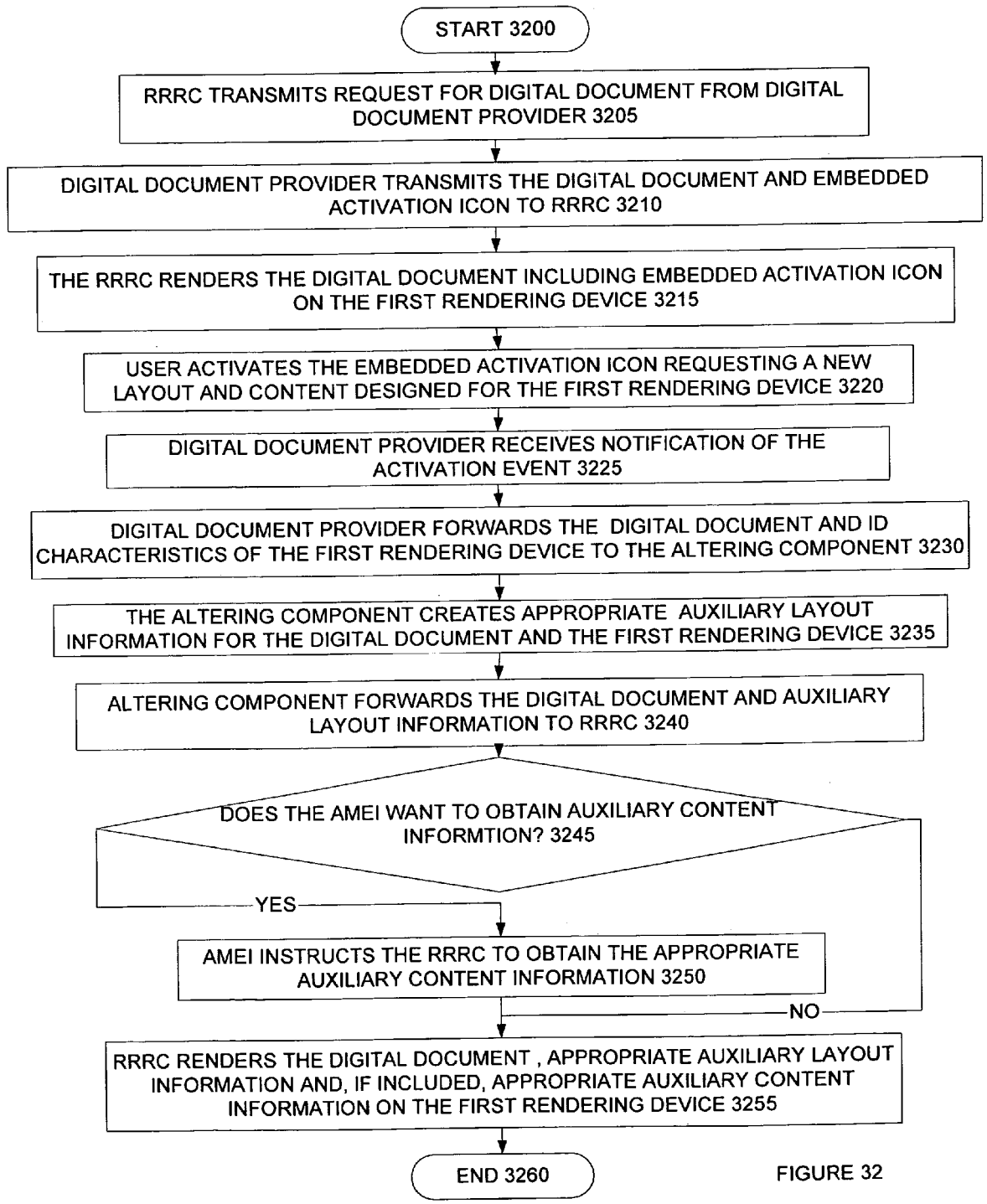
FIG. 32 illustrates operations associated with at least the ninth embodiment.

Therefore, as illustrated in FIG. 32, various operations occur following the user activating an initial request event. The operations begin at 3200 and control proceeds to 3205, at which, an RRRC transmits a request (which may not include identification of at least one characteristic associated with the first rendering device and the digital document provider may not have the capabilities of discerning the ID characteristics of the first rendering device 160) to the digital document provider to provide the digital document. Control then proceeds to 3210, at which the digital document provider transmits the digital document with an embedded activation icon to the RRRC. Control then proceeds to 3215, at which the RRRC renders the digital document including the activation icon on the first rendering device. Control then proceeds to 3220, at which the user activates or excites the activation icon requesting a new layout and content designed for the first rendering device. Control then proceeds to 3225, at which a request to provide the digital document with auxiliary layout information may be transmitted from the RRRC to the digital document provider (that request including identification of at least one characteristic associated with the first rendering device of the user system).

Control then proceeds to 3230, at which the digital document provider transmits the digital document and corresponding ID characteristics of the first rendering device to the altering component, located at the remote source. Control then proceeds to 3235, at which the altering component formulates appropriate auxiliary layout information digital document based on the ID characteristics of the first rendering device and control proceeds to 3240. At 3240, the formulated auxiliary layout information and the digital document are transmitted to the RRRC by the altering component. Subsequently, control proceeds to 3245, at which a determination is made by the AMEI included in the digital document and the auxiliary layout information provided whether auxiliary content information is needed. If not, control proceeds to 3255. If so, control proceeds to 3250, at which the AMEI instructs the RRRC to obtain the appropriate auxiliary content information (for example, by communicating with the digital document provider who originally provided the digital document, communicating with a remote source, e.g., one or more servers, or communicating with the altering component).

Subsequently, control proceeds to 3255, at which the content information may be rendered by the RRRC on the first rendering device, e.g., the screen of the mobile phone, PDA, etc. according to the AMEI, auxiliary layout information and, if included, the auxiliary content information. Control then proceeds to 3260, at which operations associated with processing the event end.

It should also be understood that, in accordance with at least this ninth embodiment of the invention, a variation may be implemented in which the user system only interacts with the digital document provider rather then the altering component (being located at a remote source) acting as a proxy of sorts for providing the auxiliary layout information to the RRRC. In such a scenario the formulated auxiliary layout information, digital document and, potentially, the appropriate auxiliary content information, would be transmitted from the altering component at the remote source to the digital document provider, who would then provide it to the requesting user system.

Moreover, it should be understood that another variation of at least this ninth embodiment may provide the altering component resident at the digital document provider rather then at a remote source.

In accordance with at least this ninth embodiment of the invention, it should further be understood that the embodiment may include a variation wherein, if it is determined that auxiliary content information is to be included in the auxiliary layout information provided to the RRRC, that auxiliary content information may be obtained by the altering component (which would forward digital document, auxiliary content information and layout information particular to the first rendering device to the user system).

In accordance with at least a tenth embodiment of the invention, a method and system are provided for tracking the usage of each of the other embodiments (one through nine). The same operations that allow digital documents to be altered in each of embodiments one through nine, may enable notification upon the activation of or subsequent to an event described in the AMEI and/or recordation of all types of request and activation events (including, but not limited to the events listed above). Thus, in accordance with at least the tenth embodiment of the invention, digital document providers may be provided with reports on what and how content has been rendered, e.g., how many pages were printed from the system over a variety of time frames, the amount of money they have made or could make if they put print advertisements on each of their printed pages, the hourly, daily, weekly and monthly display and printing totals, estimates on their annual number of displayed and printed digital documents, the top 100 most rendered (e.g., displayed or printed) digital documents given a variety of time frames and upon each print event, a collection of information relating to what digital document was rendered, a time and date of each rendering, an Internet Protocol address of a computer rendering the document, the type of RRRC which was in use, and, depending on the digital document rendered, the city, state, country, market area of the user. Similar information can be collected for request events. FIG. 33 includes an exemplary format of a data report generated by such tracking.

Moreover, in accordance with at least this embodiment of the invention, information may be recorded that indicates what content has been rendered, how it has been rendered (i.e., using what medium), along with all variations of auxiliary content and layout information. Thus, the operations and functionality of the tenth embodiment may be combined with any of the remaining embodiments, one through nine, to allow tracking of content rendering.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, it should be understood that the more then one set of auxiliary layout information may be formulated for the content information of a digital document. Moreover, more then one set of auxiliary layout information may be transmitted to the RRRC to enable rendering of the digital document's content information in multiple ways (including different versions of the content information and/or auxiliary content information) in response to various events initiated by the RRRC. For example, one set of auxiliary layout information, including auxiliary content information, may be rendered in response to a print event. The AMEI of the digital document may also instruct that, subsequent to completion of that print event, a second alternative set of auxiliary layout information may be rendered on the first rendering device (optionally including different, and/or additional sets auxiliary content information).

What is claimed is:

1. A method of creating a digital document for viewing via a browser, the digital document including content, layout, additional information and Altering Machine Executable Instructions (AMEI), the method comprising:

in response to a User Initiated Print Event (UIPE), implementing the digital document specific AMEI to:
alter at least part of the content, layout, and additional information using a component which communicates with the browser;
apply Medium Specific Auxiliary Layout Information (MSALI) based on the amount of content in the digital document; and to
calculate and apply at least one of an appropriate type or number of Medium Specific Auxiliary Content Information (MSACI) based on the amount of content in the digital document to produce an altered digital document; and forwarding the altered digital document to a device associated with or identified by the user and on which the altered digital document is to be rendered based on the UIPE activated in coordination with the implemented AMEI, wherein the digital document specific AMEI includes instructions for recognizing and temporarily pausing the UIPE, instructions for altering part or all of the digital document that include instructions for obtaining the MSACI and the MSALI and rendering the obtained MSACI as part of the digital document based on the obtained MSALI, and rendering the altered digital document subsequent to the UIPE.

2. The method of claim 1, wherein the UIPE is a browser activation event.

3. The method of claim 2, wherein the UIPE is an activation of a button or icon in the digital document or a button or icon located on the browser or a pull-down menu of a browser.

4. The method of claim 1, wherein the MSALI includes instructions for altering and rendering the altered digital document in response to the UIPE.

5. The method of claim 1, wherein the MSALI includes instructions for altering and rendering the altered digital document subsequent to the UIPE.

6. The method of claim 1, wherein the MSALI includes instructions for obtaining MSACI.

7. The method of claim 1, wherein the MSALI is obtained from the digital document provider with the digital document.

8. The method of claim 1, wherein the MSALI is obtained from the digital document provider prior to or upon the initiation of the UIPE.

9. The method of claim 1, wherein the MSALI is obtained from at least one remote source prior to or upon the initiation of the UIPE.

10. The method of claim 1, wherein the MSALI is obtained from the user system prior to or upon the initiation of the UIPE.

11. The method of claim 1, wherein the MSACI includes instructions for altering and rendering the digital document in response to the UIPE.

12. The method of claim 1, wherein the MSACI includes instructions for altering and rendering the digital document subsequent to the UIPE.

13. The method of claim 1, wherein the MSACI includes at least one advertisement to be rendered in response to the UIPE.

14. The method of claim 1, wherein the MSACI includes at least one advertisement to be rendered subsequent to the UIPE.

15. The method of claim 1, wherein the MSACI includes instructions for obtaining MSALI.

16. The method of claim 1, wherein the MSACI is obtained from the digital document provider with the digital document.

17. The method of claim 1, wherein the MSACI is obtained from the digital document prior to or upon the initiation of the UIPE.

18. The method of claim 1, wherein the MSACI is obtained from at least one remote source prior to or upon the initiation of the UIPE.

19. The method of claim 1, wherein the MSACI is obtained from the user system prior to or upon the initiation of the UIPE.

20. The method of claim 1, wherein the applying MSALI and the appropriate type and number of MSACI comprises altering content, layout and additional information of a digital document according to the digital document specific, that method further comprising:
receiving the digital document and separating primary content from secondary content;
creating MSALI for the primary content given the print medium on which the digital document will be displayed and the amount of content in the digital document; and
applying the appropriate type and number of advertisements or URL links to obtain the appropriate type and number of advertisements specifically designed for rendering the digital document in a print medium.

21. An article of manufacture for altering content, layout or additional information of a digital document for viewing via browser according to digital document specific Altering Machine Executable Instructions (AMEI) included in the digital document, the article of manufacture comprising a machine readable medium containing one or more programs which when executed implement the steps of:
installing the digital document specific AMEI, which communicates with the browser on a user system;
in response to a User Initiated Print Event (UIPE), implementing the digital document specific AMEI to:
alter at least part of the content, layout and additional information using a component which communicates with the browser;
apply Medium Specific Auxiliary Layout Information (MSALI) based on the amount of content in the digital document;
calculate and apply at least one of the appropriate type or number of Medium Specific Auxiliary Content Information (MSACI) based on the amount of content in the digital document to produce an altered digital document; and
forwarding the altered digital document to a device associated with or identified by the user and on which the altered digital document is to be rendered based on the UIPE activated in acoordination with the implemented AMEI, wherein
the digital document specific AMEI includes instructions for recognizing and temporarily pausing the UIPE, instructions for altering part or all of the digital document that include instructions for obtaining the MSACI and the MSALI and rendering the obtained MSACI as part of the digital document based on the obtained MSALI, and rendering the altered digital document subsequent to the UIPE.

22. The article of claim 21, wherein the UIPE is a browser event.

23. The article of claim 21, wherein the UIPE is an activation of a button or icon in the digital document or a button or icon or a pull-down menu of a browser.

24. The article of claim 21, wherein the MSALI is obtained from the digital document provider with the digital document.

25. The article of claim 21, wherein the MSALI is obtained from the digital document provider prior to or upon the initiation of the UIPE.

26. The article of claim 21, wherein the MSALI is obtained from at least one remote source prior to or upon the initiation of the UIPE.

27. The article of claim 21, wherein the MSALI is obtained from the user system prior to or upon the initiation of the UIPE.

28. The article of claim 21, wherein the MSACI includes instructions for altering and rendering the digital document in response to the UIPE.

29. The article of claim 21, wherein the MSACI includes instructions for altering and rendering the digital document subsequent to the UIPE.

30. The article of claim 21, wherein the MSACI includes at least one advertisement to be rendered in response to the UIPE.

31. The article of claim 21, wherein the MSACI includes at least one advertisement to be rendered subsequent to the UIPE.

32. The article of claim 21, wherein the MSACI includes instructions for obtaining MSALI.

33. The article of claim 21, wherein the MSACI is obtained from the digital document provider with the digital document.

34. The article of claim 21, wherein the MSACI is obtained from the digital document prior to or upon the initiation of the UIPE.

35. The article of claim 21, wherein the MSACI is obtained from at least one remote source prior to or upon the initiation of the UIPE.

36. The article of claim 21, wherein the MSACI is obtained from the user system prior to or upon the initiation of the UIPE.

37. The article of manufacture of claim 21, wherein the applying MSALI and the appropriate type and number of medium specific auxiliary content information includes altering content, layout or additional information of a digital document according to digital document specific AMEI, that altering comprising:

receiving the digital document and separating primary content from secondary content;

creating MSALI for the primary content given the print medium on which the digital document will be displayed and the amount of content in the digital document; and applying the appropriate type and number of advertisements or URL links to obtain the appropriate type and number of advertisements designed for rendering the digital document on the print medium.

* * * * *